United States Patent
Furuta et al.

(10) Patent No.: US 7,092,516 B2
(45) Date of Patent: Aug. 15, 2006

(54) ECHO PROCESSOR GENERATING PSEUDO BACKGROUND NOISE WITH HIGH NATURALNESS

(75) Inventors: Satoru Furuta, Tokyo (JP); Shinya Takahashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 430 days.

(21) Appl. No.: 10/245,578

(22) Filed: Sep. 18, 2002

(65) Prior Publication Data

US 2003/0076947 A1    Apr. 24, 2003

(30) Foreign Application Priority Data

Sep. 20, 2001 (JP) .............................. 2001-287438

(51) Int. Cl.
*H04M 9/08* (2006.01)

(52) U.S. Cl. .................................. 379/406.05; 370/289

(58) Field of Classification Search ................ 379/406, 379/388, 390; 370/286–292; 455/63.1, 455/570, 114.2, 501
See application file for complete search history.

(56) References Cited

U.S. PATENT DOCUMENTS

| | | | |
|---|---|---|---|
| 5,561,668 A * | 10/1996 | Genter | 370/288 |
| 5,920,834 A | 7/1999 | Sih et al. | |
| 6,163,608 A | 12/2000 | Romesburg et al. | |
| 6,658,107 B1 * | 12/2003 | Sorqvist et al. | 379/406.05 |

FOREIGN PATENT DOCUMENTS

| | | |
|---|---|---|
| DE | 197 29 521 | 1/1999 |
| EP | 1 041 539 | 10/2000 |
| EP | 1 059 628 | 12/2000 |
| JP | 2000-224081 | 8/2000 |
| JP | 2000-347688 | 12/2000 |
| WO | WO 00/25441 | 5/2000 |
| WO | WO 00/74362 | 12/2000 |
| WO | WO 01/10102 | 2/2001 |
| WO | WO 01/33814 | 5/2001 |

OTHER PUBLICATIONS

"Echo Cancellers", Proceedings of International Telecommunication Union, ITU-T Recommendation G. 165, Mar. 1993, pp. 1-27.
"Acoustic Echo Controllers", Proceedings of International Telecommunication Union, ITU-T Recommendation G.167, Mar. 1993, pp. 1-16.

* cited by examiner

*Primary Examiner*—Sinh Tran
*Assistant Examiner*—Walter F Briney III
(74) *Attorney, Agent, or Firm*—Oblon, Spivak, McClelland, Maier & Neustadt, P.C.

(57) ABSTRACT

An echo processor includes an echo suppression amount decider which compares a state of an outgoing input signal to be sent including an echo with a state of an incoming input signal and calculates an echo suppression amount based on the comparison, a time-frequency transformer which transforms the outgoing input signal in the time domain into the frequency domain, thereby generating an amplitude spectrum and a phase spectrum, a noise-spectrum estimator which estimates a noise spectrum from the amplitude spectrum, a mixer which mixes an amount of the noise spectrum based on the echo suppression amount with the amplitude spectrum, and a frequency-time transformer which generates an outgoing output signal including a noise in the time domain on the basis of the amplitude spectrum, with which an amount of the noise spectrum is mixed by the mixer, and the phase spectrum, and outputs the outgoing output signal.

16 Claims, 10 Drawing Sheets

ECHO PROCESSOR GENERATING PSEUDO BACKGROUND NOISE WITH HIGH NATURALNESS

BACKGROUND OF THE INVENTION

1. Field of the Invention

The present invention relates to an echo processor for reducing echoes generated in communication wires or generated by an echogenic environment between a speaker and microphone in a voice telecommunication system, a television conference system, and so on.

2. Description of Background Art

Echo processors (echo cancelers) are widely used for canceling acoustic echoes or electrical echoes generated in television conference systems, handsfree car telephones, or telecommunication lines. A typical echo canceler includes an adaptive filter for canceling echoes and an echo suppressor for suppressing the amplitudes of residual echoes that the adaptive filter cannot cancel out. However, typical echo suppressors suppress acoustic background noises in addition to residual echoes, thereby accentuating a sense of interruptions of background noise and deteriorating the communication quality. In order to mitigate a sense of discontinuity, an echo canceler generates pseudo background noise components and mixes them with output signals.

An example of such echo processors is disclosed in JP-A-2000-224081 entitled "Echo Canceler Device."

FIG. 12 is a block diagram illustrating a structure of a conventional echo processor disclosed in JP-A-2000-224081. As shown in FIG. 12, the echo processor includes an adaptive filter 100, a pseudo background noise generator 120, an AFB (Analysis Filter Bank) 131, a first suppressor 132, an adder 133, an SFB (Synthesis Filter Bank) 134, a second suppressor 135, a first level estimator 136, a second level estimator 137, and a detector 138.

Operations of the echo processor will be described next. The adaptive filter 100 partially cancels out an echo in an input signal S[t] and outputs an echo-canceled input signal U[t]. The echo-canceled input signal U[t] still includes residual echoes since the adaptive filter 100 cannot remove all echo components.

The AFB 131 divides the input signal U[t] according to frequency bands, whereby generates frequency-divided input signal U[t,j]. The AFB 131 supplies the input signals U[t,j] to the first suppressor 132 and the pseudo background noise generator 120. The suffix j means the number given to each frequency band. The first suppressor 132 gives a loss Loss1 to the residual echo components at each band to attenuate, suppress, or remove the echo. The loss Loss1 is calculated as follows:

First, the first suppressor 132 compares an average power Pow(Rin) of the far-end speech signal Rin with an average power Pow(S[j]) of the input signals U[t,j]. If the former is greater than the latter, the first suppressor 132 subtracts a constant μ from a previous loss component Loss1[j], whereby a new loss component Loss1[j] is obtained in accordance with formula (1).

$$Loss1[j]=Loss1[j]-\mu \quad (1)$$

where μ is a constant, i.e., a step value of suppression amount (loss) Loss1.

On the contrary, if the average power Pow(Rin) is equal to or less than the average power Pow(S[j]), the first suppressor 132 adds the constant μ to the previous loss component Loss1[j], whereby a new loss component Loss1 [j] is obtained in accordance with formula (2).

$$Loss1[j]=Loss1[j]+\mu \quad (2)$$

In either event, the first suppressor 132 adjusts the loss component Loss1[j] to fall into a range represented in formula (3).

$$Loss(max) \leq Loss1[j] \leq 0(dB) \quad (3)$$

where Loss(max) is the maximum loss that the first suppressor 132 can give to residual echo components.

Repetitions of the comparison and adjustment may control to converge the loss Loss1 depending upon the level of the residual echo. During the process of applying the loss Loss1 to the residual echo, the first suppressor 132 not only suppresses or removes most of the residual echo components, but also suppresses acoustic background noise components mixed with the echo components, accentuating a sense of speech interruptions for the far-end talker if no additional proceeding is applied.

The pseudo background noise generator 120 estimates the levels of the background noises of the frequency-divided input signals U[t,j] and generates pseudo background noises N[t,j] of which the levels are the same as that of the background noise. The pseudo background noises N[t,j] are supplied to the adder 133, which adds the pseudo background noises N[t,j] to the input signals U[t,j] in which the echo components have been reduced by the first suppressor 132. The background noise levels after the addition may be adjusted to be equal to the pseudo background noise level.

The output signals O[t,j] from the adder 133 divided in accordance with frequencies are supplied to the SFB 134 that synthesizes them into an output signal O[t]. The SFB 134 supplies the output signal O[t] to the second suppressor 135.

The second level estimator 137 measures the instantaneous levels of the frequency-divided output signals O[t,j]. The first level estimator 136 measures the instantaneous level of the pseudo background noises N[t,j] at respective frequency bands. Comparing the measurements by the level estimators 136 and 137 leads a decision as to whether there is a near-end speech actually as will be described next.

The measurements by both level estimators 136 and 137 are supplied to the detector 138 that detects sounding or silence (decides whether or not there is a near-end speech actually) on the basis of the measurements. The detector 138 synthesizes the sounding/silent detection results at respective frequency bands. If it is decided that there is a near-end speech at one or more frequency bands, the detector 138 outputs a digital signal "1" that means sounding. If it is decided that there is no near-end speech at all frequency bands, the detector 138 outputs a digital signal "0" that means silence.

The digital signal output from the detector 138 is supplied to the second suppressor 135 that decides a suppression amount Loss2 on the basis of the output signal of the detector 138 in accordance with the manner that will be described next, and gives the loss Loss2 to the signal O[t] for attenuating it.

If the decision by the detector 138 is zero (silence), the detector 138 adds the constant μ' to a previous loss Loss2, whereby a new loss Loss2 is obtained in accordance with formula (4).

$$Loss2=Loss2+\mu' \quad (4)$$

where μ' is a step value of suppression amount (loss) Loss2. μ' is a positive constant of which the absolute value is sufficiently small, e.g., 0.1 through 0.01 dB.

On the contrary, if the decision by the detector 138 is one (sounding), the detector 138 sets the loss Loss2 at zero in accordance with formula (5).

$$Loss2=0(dB) \quad (5)$$

As will be understood from formula (4), when there is no actual sound, the second suppressor 135 increases the suppression amount Loss2 stepwise, so as to suppress the background noise only. On the contrary, when there is any speech component, the suppression amount Loss2 is set at 0 (dB) instantly in accordance with formula (5), thereby preventing the actual speech component from being suppressed.

As described above, the conventional echo processor divides the echo-canceled input signal into input signals at respective frequency bands by means of a band division filter, estimates the levels of background noises at respective bands, generates pseudo background noise components having an amplitude spectrum resembling that of the background noise, and mixes the pseudo background noise components with the signal suppressed by an NLP (non-linear process), thereby attempting to mitigate a sense of interruptions of background noise.

In the conventional echo processor, the amplitude spectrum of the pseudo background noise components to be mixed may be similar to that of the background noise within the input signal since the levels of the background noise components within the input signal are estimated at respective bands. However, the phase spectrum of the pseudo background noise components is different from that of the background noise within the input signal. Accordingly, although the pseudo background noise components are included in the final output signal, the final output signal still causes a sense of unnaturalness or strangeness.

SUMMARY OF THE INVENTION

It is therefore an object of the present invention to provide an echo processor that can generate a pseudo background noise with high naturalness depending upon the spectrum of an input signal to be sent.

In accordance with an aspect of the present invention, an echo processor includes an echo suppression amount decider, a time-frequency transformer, a noise-spectrum estimator, a mixer, and a frequency-time transformer. The echo suppression amount decider compares a state of an outgoing input signal to be sent including an echo with a state of an incoming input signal, and calculates an echo suppression amount on the basis of the comparison. The time-frequency transformer transforms the outgoing input signal in the time domain into the frequency domain, thereby generating an amplitude spectrum and a phase spectrum. The noise-spectrum estimator estimates a noise spectrum from the amplitude spectrum. The mixer mixes an amount of the noise spectrum based on the echo suppression amount with the amplitude spectrum. The frequency-time transformer generates an outgoing output signal including a noise in the time domain on the basis of the amplitude spectrum, with which an amount of the noise spectrum is mixed by the mixer, and the phase spectrum, and outputs the outgoing output signal.

With such a structure, the noise spectrum is mixed with the amplitude spectrum while the phase spectrum is not subject to a similar noise mixing process. Accordingly the phase spectrum of the outgoing input signal is maintained to generate a pseudo background noise with high naturalness.

Furthermore, since the amplitude spectrum is mixed with an amount of the noise spectrum based on the echo suppression amount the noise spectrum calculated on the basis of the comparison of the outgoing input signal with the incoming input signal, the echo processor can generate an appropriate pseudo background noise with high naturalness that depends on conditions and is comfortable for a sense of hearing.

In accordance with another aspect of the present invention, an echo processor includes an echo suppression amount decider, a time-frequency transformer, a noise-spectrum estimator, a mixer, a phase randomizer, and a frequency-time transformer. The echo suppression amount decider compares a state of an outgoing input signal to be sent including an echo with a state of an incoming input signal, and calculates an echo suppression amount on the basis of the comparison. The time-frequency transformer transforms the outgoing input signal in the time domain into the frequency domain, thereby generating an amplitude spectrum and a phase spectrum. The noise-spectrum estimator estimates a noise spectrum from the amplitude spectrum. The mixer mixes the noise spectrum with the amplitude spectrum. The phase randomizer randomizes a phase of the phase spectrum on the basis of the echo suppression amount. The frequency-time transformer generates an outgoing output signal including a noise in the time domain on the basis of the amplitude spectrum, with which the noise spectrum is mixed by the mixer, and the phase spectrum, of which the phase is randomized by the phase randomizer, and outputs the outgoing output signal.

With such a structure, when the echo suppression amount is large, the degree of randomization of the phase of the phase spectrum may be increased, so that the residual echo becomes to be hardly discriminated. When the echo suppression amount is small, the degree of randomization of the phase may be decreased, thereby maintaining the naturalness of the pseudo background noise.

In accordance with still another aspect of the present invention, an echo processor includes an echo suppression amount decider, a time-frequency transformer, a noise-spectrum estimator, a mixer, an amplitude randomizer, and a frequency-time transformer. The echo suppression amount decider compares a state of an outgoing input signal to be sent including an echo with a state of an incoming input signal, and calculates an echo suppression amount on the basis of the comparison. The time-frequency transformer transforms the outgoing input signal in the time domain into the frequency domain, thereby generating an amplitude spectrum and a phase spectrum. The noise-spectrum estimator estimates a noise spectrum from the amplitude spectrum. The mixer mixes the noise spectrum with the amplitude spectrum. The amplitude randomizer randomizes amplitude of the amplitude spectrum on the basis of the echo suppression amount. The frequency-time transformer generates an outgoing output signal including a noise in the time domain on the basis of the phase spectrum and the amplitude spectrum, of which the amplitude is randomized by the amplitude randomizer, and with which the noise spectrum is mixed by the mixer, and outputs the outgoing output signal.

With such a structure, when the echo suppression amount is large, the degree of randomization of the amplitude of the amplitude spectrum may be increased, so that the residual echo becomes to be hardly discriminated. When the echo suppression amount is small, the degree of randomization of the amplitude may be decreased, thereby maintaining the naturalness of the pseudo background noise.

In accordance with a further aspect of the present invention, the echo processor includes a time-frequency transformer, a noise-spectrum estimator, a noise-amplitude randomizer, a mixer, and a frequency-time transformer. The time-frequency transformer transforms an outgoing input signal to be sent including an echo in the time domain into the frequency domain, thereby generating an amplitude spectrum and a phase spectrum. The noise-spectrum estimator estimates a noise spectrum from the amplitude spectrum. The noise-amplitude randomizer randomizes amplitude of the noise spectrum on the basis of a background noise level in the outgoing input signal. The mixer for mixing the noise spectrum, of which the amplitude is randomized by the noise-amplitude randomizer, with the amplitude spectrum. The frequency-time transformer generates an outgoing output signal including a noise in the time domain on the basis of the phase spectrum and the amplitude spectrum, with which the noise spectrum is mixed by the mixer, and outputs the outgoing output signal.

With such a structure, when the background noise level is larger than a prescribed value, the degree of randomization of the amplitude of the noise spectrum may be increased, so that the echo becomes to resemble a white noise although the outgoing input signal includes the echo.

BRIEF DESCRIPTION OF THE DRAWINGS

With reference to the accompanying drawings, various embodiments of the present invention will be described hereinafter. In the drawings.

DETAILED DESCRIPTION OF PREFERRED EMBODIMENTS

First Embodiment

Figure 1:
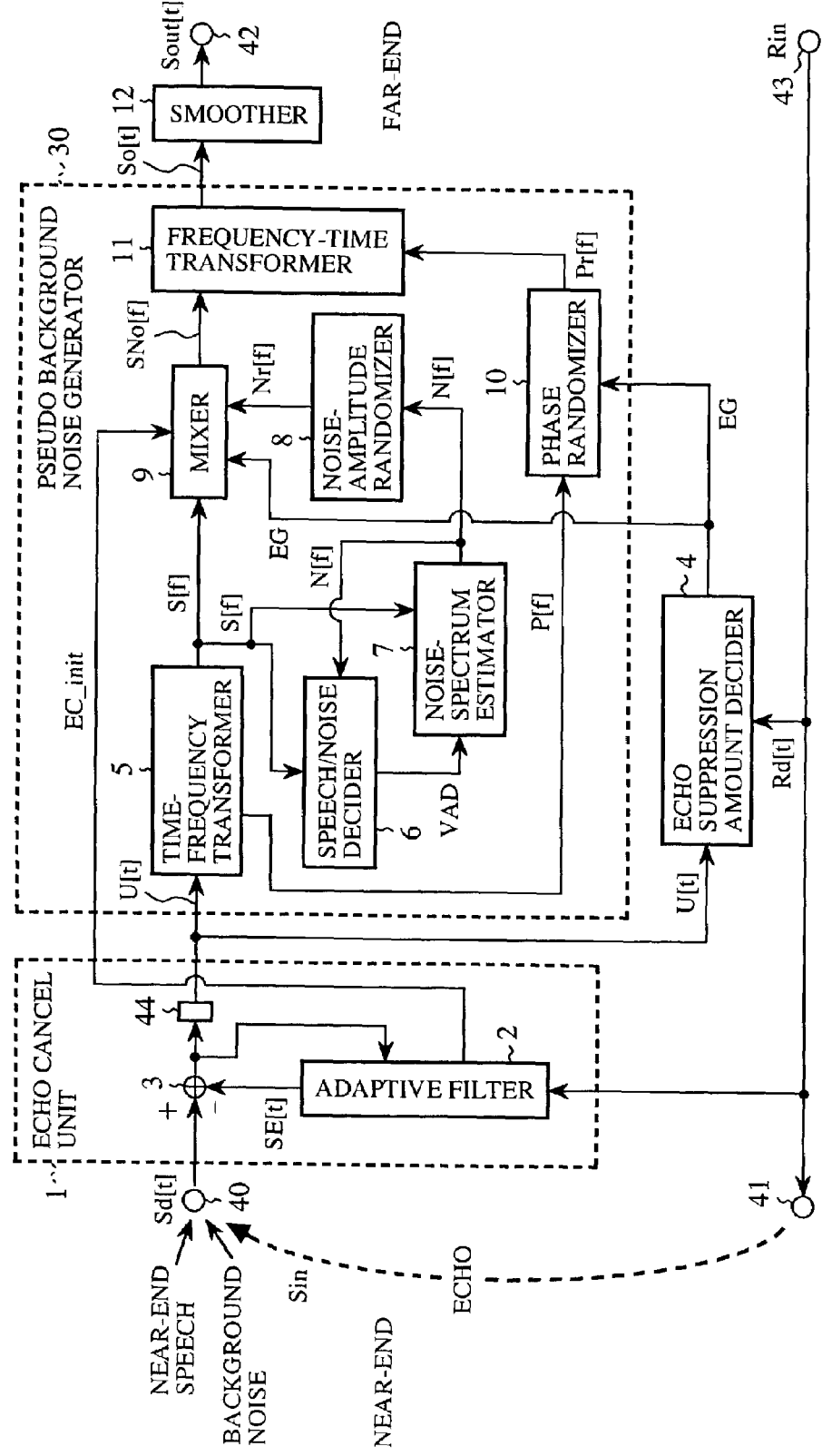
FIG. 1 is a block diagram illustrating the structure of an echo processor according to a first embodiment of the present invention.

FIG. 1 is a block diagram illustrating the structure of an echo processor according to a first embodiment of the present invention. As shown in FIG. 1, the echo processor includes an echo cancel unit 1, a pseudo background noise generator 30, an echo suppression amount decider 4, a smoother 12, a microphone 40, a speaker 41, a transmission circuit 42, and a reception circuit 43.

The echo cancel unit 1 includes an adaptive filter 2, a subtracter 3, and a divider 44. The pseudo background noise generator 30 includes a time-frequency transformer 5, a speech/noise decider 6, a noise-spectrum estimator 7, a noise-amplitude randomizer 8, a mixer 9, a phase randomizer 10, and a frequency-time transformer 11.

Figure 2:
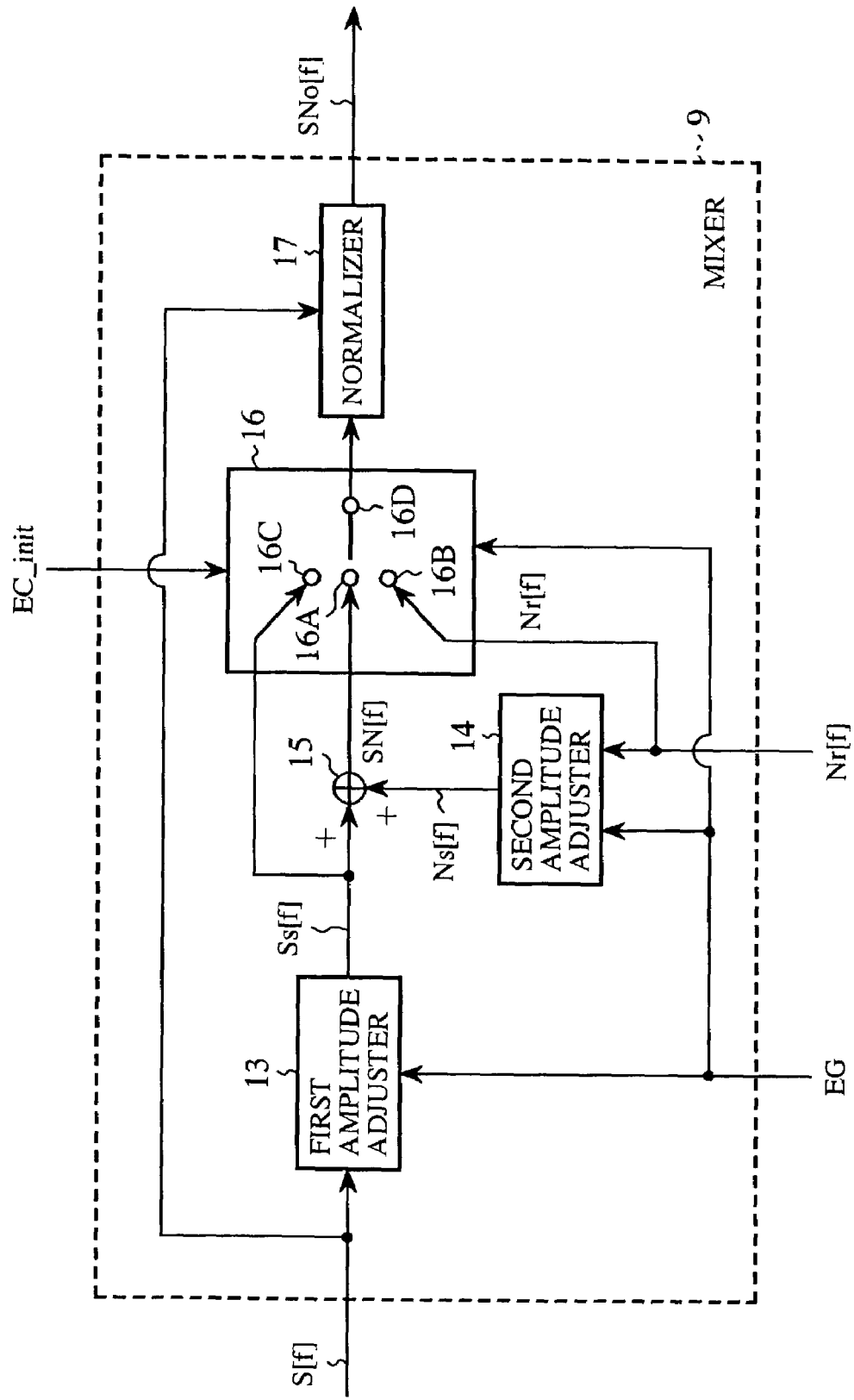
FIG. 2 is a block diagram showing details of a mixer of the echo processor shown in FIG. 1.

The internal structure of the mixer 9 in FIG. 1 is illustrated in FIG. 2. As shown in FIG. 2, the mixer 9 includes a first amplitude adjuster 13, a second amplitude adjuster 14, an adder 15, a selector 16, and a normalizer 17.

Operations of the echo processor will be described next. The microphone 40 generates an outgoing input signal Sd[t] on the basis of environmental sounds including a near-end speech, a background noise, and an acoustic echo, and then supplies the outgoing input signal Sd[t] to the echo cancel unit 1.

The reception circuit 43 receives a far-end speech signal Rin resulting from a far-end speech, and converts the far-end speech signal Rin into a incoming input signal Rd[t]. The speaker 41 converts the incoming input signal Rd[t] supplied thereto into sound. The incoming input signal Rd[t] is also supplied to the echo cancel unit 1 and the echo suppression amount decider 4.

The outgoing input signal Sd[t] generated by the microphone 40 is supplied to the subtracter 3 of the echo cancel unit 1. The subtracter 3 subtracts a pseudo echo SE[t] from the outgoing input signal Sd[t], thereby generating and outputting an echo-canceled outgoing input signal U[t] where the echo is partially canceled.

The echo-canceled outgoing input signal U[t] is supplied to the adaptive filter 2. In addition, the divider 44 divides the echo-canceled outgoing input signal U[t] into frames having a uniform frame length (e.g. 20 ms) and supplies the frames to the pseudo background noise generator 30 and the echo suppression amount decider 4.

As described above, the adaptive filter 2 is provided with the echo-canceled outgoing input signal U[t] and the incoming input signal Rd[t] corresponding to the far-end speech. On the basis of the incoming input signal Rd[t] and the echo-canceled outgoing input signal U[t], the adaptive filter 2 estimates an acoustic echogenicity in the environment including the speaker 41 and the microphone 40 or electrical echogenicity of communication wires, and serially calculates the filter factor h[n] thereof based on them. The adaptive filter 2 also generates a pseudo echo SE[t] on the basis of the incoming input signal Rd[t] and the filter factor h[n]. However, at the initial stage where the estimation of the filter factor h[n] does not converge, the adaptive filter 2 does not generate the pseudo echo SE[t], and instead, activates a filter-initial-stage flag EC_init and outputs it to the mixer 9. After the initial stage, the adaptive filter 2 resets the filter-initial-stage flag EC_init.

The echo-canceled outgoing input signal U[t] contains a residual echo that the echo cancel unit 1 cannot cancel out. In order to suppress the residual echo, the echo suppression amount decider 4 decides and outputs a residual-echo suppression amount EG (dB). For the decision of the residual-echo suppression amount EG, the echo suppression amount decider 4 detects the levels of frames derived from the echo-canceled outgoing input signal U[t] and compares the respective levels with a threshold. The echo suppression amount decider 4 also detects the level of the incoming input signal Rd[t] and compares it with another threshold. On the basis of the comparisons, the echo suppression amount decider 4 decides the residual-echo suppression amount EG. However, at the initial stage, the echo suppression amount decider 4 does not decide the residual-echo suppression amount EG, and instead, outputs a residual-echo suppression amount EG that is greater than 24 dB.

The residual-echo suppression amount EG is a factor for suppressing the amplitude of the residual echo in the echo-canceled outgoing input signal U[t]. The greater the residual-echo suppression amount EG is, the higher the ability of attenuating residual echo is. The echo suppression amount decider 4 outputs the residual-echo suppression amount EG depending upon conditions as represented in Table 1. Table 1 represents only an example of manner for deciding the residual-echo suppression amount EG, and another manner may be contemplated by modifying Table 1.

TABLE 1

| LEVEL OF ECHO-CANCELED OUTGOING INPUT SIGNAL U[T] | LEVEL OF THE INCOMING INPUT SIGNAL RD[T] | CONDITION | RESIDUAL-ECHO SUPPRESSION AMOUNT EG |
|---|---|---|---|
| HIGH (ONLY NEAR-END SPEECH IS LOUD OR NEAR-END SPEECH AND ECHO ARE LOUD) | HIGH (FAR-END SPEECH IS LOUD) | 1 (DOUBLE TALK) | EG = 60 dB |
| | LOW (FAR-END SPEECH IS SILENT) | 2 | EG = 0 dB |
| LOW (NEAR-END SPEECH SIGNAL IS LOW OR ONLY ECHO IS LOUD) | HIGH (FAR-END SPEECH IS LOUD) | 3 | 12 dB < EG ≦ 24 dB |
| | LOW (FAR-END SPEECH IS SILENT) | 4 (SILENT) | EG = 0 dB |

In condition 1 in Table 1, the levels of the echo-canceled outgoing input signal U[t] and the incoming input signal Rd[t] are high (greater than respective thresholds). Thus, condition 1 is a double talk condition where both of the near-side and far-side talkers talk. In this case, it is expected that the far-side talker is not particularly annoyed by the residual echo from the near-side talker's device. Therefore, the echo suppression amount decider 4 sets the residual-echo suppression amount EG at 6 dB that is not significantly great.

In condition 2, since the level of echo-canceled outgoing input signal U[t] is high while the level of incoming input signal Rd[t] is low, only the near-end talker talks. In this case, it is also expected that the far-side talker is little annoyed by the residual echo from the near-side talker's device. Therefore, the echo suppression amount decider 4 sets the residual-echo suppression amount EG at 0 dB.

In condition 4, both of the echo-canceled outgoing input signal U[t] and the incoming input signal Rd[t] are low. This means that both of near-end and far-end talkers do not talk.

In this case, the echo suppression amount decider 4 also sets the residual-echo suppression amount EG at 0 dB since residual echoes will not disturb conversation.

However, in condition 3 in Table 1, the echo-canceled outgoing input signal U[t] is low while the incoming input signal Rd[t] is high. This means that only the far-end talker talks, so that the acoustic replica of far-end speech may be detected by the microphone 40 and might return to the far-end talker. In this case, the echo suppression amount decider 4 selects a suitable value as the residual-echo suppression amount EG from a range greater than 12 dB and less than or equal to 24 dB on the basis of the level of background noise. If the level of background noise is high (signal-to-noise ratio is low), the microphone 40 sets the residual-echo suppression amount EG at a low value. As the level of background noise drops, the residual-echo suppression amount EG is set to be greater. The reason is that as the level of background noise lowers, the level of residual echo becomes relatively higher within the outgoing input signal and becomes more necessary to be suppressed. In contrast, when the level of back ground noise is high, the residual echo is incorporated into background noise to be hardly discriminated, so that it is unnecessary to increase the suppression amount.

The background noise level is detected by the echo suppression amount decider 4. For example, the echo suppression amount decider 4 measures the power of each frame derived from the echo-canceled outgoing input signal U[t] whenever the echo suppression amount decider 4 receives the frame from the divider 44. The echo suppression amount decider 4 stores the power measurement results with respect to the latest 50 frames, and selects the lowermost power level from the stored measurement results as the background noise level.

The frames derived from the echo-canceled outgoing input signal U[t] are supplied to the time-frequency transformer 5 of the pseudo background noise generator 30. The time-frequency transformer 5 transforms the echo-canceled outgoing input signal U[t] into an amplitude spectrum S[f] and a phase spectrum P[f] by means of a 256-point fast Fourier transform (FFT) on the frames derived from the echo-canceled outgoing input signal U[t]. The amplitude spectrum S[f] is supplied to the speech/noise decider 6 and the mixer 9 while the phase spectrum P[f] is supplied to the phase randomizer 10.

On the basis of the amplitude spectrum S[f] and the noise spectrum [f], the speech/noise decider 6 decides as to whether the current frame involves the near-end speech or mostly involves to the background noise. Then, the speech/noise decider 6 prepares a speech/noise decision signal VAD indicating the decision and supplies it to the noise-spectrum estimator 7. A preferred embodiment of the speech/noise decider 6 is a modification of a noise-likelihood decider disclosed in JP-A-2000-347688 entitled "Noise Suppressor," which is incorporated by reference herein. The preferred speech/noise decider 6 includes the noise-likelihood decider in the Japanese publication and outputs the speech/noise decision signal VAD corresponding to a noise-likelihood level (LEVELnoise), which is the output of the noise-likelihood decider, as indicated in Table 2.

Operations of the speech/noise decider 6 (noise-likelihood decider) will be described next. The speech/noise decider 6 determines components L1, L2, and L3 of LEVELnoise using the maximum RACmax of auto-correlation coefficient of the low-pass residual signal, the low-pass residual power POWres, the frame power POWfr, and thresholds TH_RACmax.h, TH_RACmax.l, TH_POWres, TH_POWfr corresponding to the above factors in accordance with the manner described below. These factors and thresholds are disclosed in the Japanese publication.

The component L1 is determined according to the maximum RACmax of auto-correlation coefficient. If RACmax>TH_RACmax.h, the component L1 is set at 2. If TH_RACmax.h≧RACmax>TH_RACmax.l, L1 is set at 1. If TH_RACmax.l≧RACmax, L1 is set at 0.

The component L2 is determined on the basis of the low-pass residual power POWres. If POWres>TH_POWres, L2 is set at 1. otherwise, L2 is set at 0.

The component L3 is determined on the basis of the frame power POWfr. If POWfr>TH_POWfr, L3 is set at 1. Otherwise, L3 is set at 0.

The noise-likelihood level LEVELnoise is the sum of the components L1, L2, and L3. Namely, LEVELnoise=L1+L2+L3. The calculation method of the factors RACmax, POWres, and POWfr is also disclosed in the Japanese publication and the description thereof will be omitted in this disclosure.

TABLE 2

| $LEVEL_{noise}$ | SPEECH/NOISE DECISION INFORMATION VAD | LIKELIHOOD OF NOISE |
|---|---|---|
| 0 |  | HIGH |
| 1 | VAD = 0 (NOISE) | . |
| 2 |  | . |
| 3 | VAD = 1 (SPEECH) | . |
| 4 |  | LOW |

The speech/noise decider 6 outputs the speech/noise decision signal VAD on the basis of the noise-likelihood level LEVELnoise in accordance with Table 2. The noise-spectrum estimator 7 is provided with the speech/noise decision signal VAD from the speech/noise decider 6 and the amplitude spectrum S[f]. If the speech/noise decision signal VAD is 0 (input sound involves a noise mainly), the noise-spectrum estimator 7 estimates a noise spectrum N[f] that is an average spectrum of the background noise included in the input signal in accordance with formula (6).

$$N[f]=(1-C) \cdot S[f]+C \cdot N_{old}[f] \quad (6)$$

where $N_{old}[f]$ is an average noise spectrum estimated from frames that were determined to involve noises mainly in the past. $N_{old}[f]$ is stored in a memory inside the noise-spectrum estimator 7. C is a constant, e.g., 0.9, which is determined suitably as a factor for deciding the renewal ratio of the noise spectrum N[f].

On the other hand, if the speech/noise decision signal VAD is 1 (input sound includes a speech), the noise-spectrum estimator 7 estimates the noise spectrum N[f] in accordance with formula (7). In this case, the noise-spectrum estimator 7 uses the old noise spectrum $N_{old}[f]$ for the current noise spectrum N[f].

$$N[f]=N_{old}[f] \quad (7)$$

In either event, after the estimation of the noise spectrum N[f], the noise-spectrum estimator 7 renews the old noise spectrum $N_{old}[f]$ in its inside memory by replacing the old noise spectrum $N_{old}[f]$ with the estimated noise spectrum N[f] of the current frame in accordance with formula (8).

$$N_{old}[f]=N[f] \quad (8)$$

The current noise spectrum N[f] is supplied to the speech/noise decider 6 and the noise-amplitude randomizer 8.

The speech/noise decider 6, as well as the noise-spectrum estimator 7, renews the old noise spectrum $N_{old}[f]$ in its inside memory by replacing the old noise spectrum $N_{old}[f]$ with the estimated noise spectrum N[f] of the current frame as represented by formula (8).

The noise-amplitude randomizer 8 randomizes the pseudo background noise with respect to time. For this purpose, in accordance with formula (9), the noise-amplitude randomizer 8 multiplies each spectrum components of the noise spectrum N[f] output from the noise-spectrum estimator 7 by a random gain rand[f] that varies in small amplitude, and thus obtains an amplitude-randomized noise spectrum Nr[f]. Frames slightly differ from one another in the shape of the spectrum Nr[f]. The noise-amplitude randomizer 8 supplies the amplitude-randomized noise spectrum Nr[f] to the mixer 9.

$$Nr[f]=rand[f] \cdot N[f] \quad (9)$$

Each spectrum component of the noise spectrum N[f] is subject to the calculation according to formula (9). That is to say, the random gain is applied to each spectrum component within a frequency range between zero and fc, which is the Nyquist frequency of the echo processor.

The mixer 9 is provided with the amplitude spectrum S[f] from the time-frequency transformer, the amplitude-randomized noise spectrum Nr[f] from the noise-amplitude randomizer 8, the residual-echo suppression amount EG, and the filter-initial-stage flag EC_init. The mixer 9 conducts various processings as will be described later. For example, the mixer 9 decides an amplitude spectrum SNo[f] on the basis of the filter-initial-stage flag EC_init and the residual-echo suppression amount EG, and supplies the amplitude spectrum SNo[f] to the frequency-time transformer 11. Next, operations of the mixer 9 will be described with reference to FIG. 2, which shows details of the mixer 9.

The first amplitude adjuster 13 shown in FIG. 2 is provided with the amplitude spectrum S[f] from the time-frequency transformer 5 and the residual-echo suppression amount EG from the echo suppression amount decider 4. On the basis of these factors, the first amplitude adjuster 13 adjusts the amplitude of the spectrum components of the amplitude spectrum S[f], especially suppresses the amplitude of the residual echo.

More specifically, in accordance with formula (10), the first amplitude adjuster 13 weights the residual-echo suppression amount EG with the first frequency weighting factor W1[f] (dB) that varies with frequency, and thus obtains a first residual-echo suppression amount g1[f]. The first frequency weighting factor W1[f] will be described later.

$$g1[f]=EG+W1[f](dB) \quad (10)$$

Next, the first amplitude adjuster 13, using the first residual-echo suppression amount g1[f], adjusts the amplitude of the amplitude spectrum S[f] in accordance with formula (11), and outputs the amplitude-adjusted amplitude spectrum Ss[f].

$$Ss[f]=10^{g1[f]/20} \cdot S[f] \quad (11)$$

Each spectrum component of the amplitude spectrum S[f] within a frequency range between zero and fc is subject to the calculations according to formulae (10) and (11).

Figure 3:
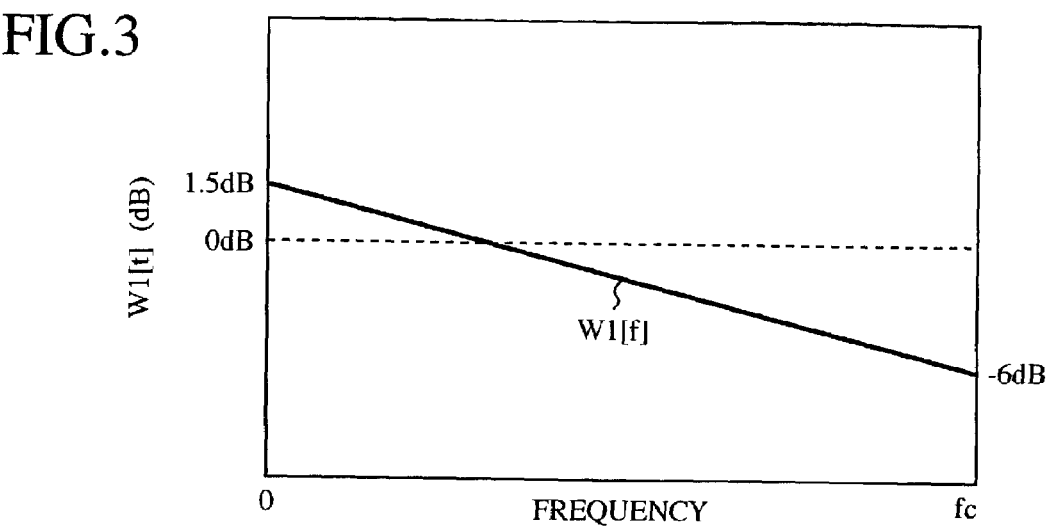
FIG. 3 is a graph showing a correlation between a first frequency weighting factor W1[f], which is used in a first amplitude adjuster of the mixer in FIG. 2, and frequency.

FIG. 3 shows a correlation between the first frequency weighting factor W1[f] and frequency. As shown in FIG. 3, with respect to the amplitude spectrum S[f], the weighting factor is large to suppress the amplitude greatly when frequency is low. When frequency is high, the weighting factor is small to suppress the amplitude slightly. Generally, residual echo components are mainly comprised of voice components of which the power is strong at low frequencies. Therefore, this embodiment, which suppresses the amplitude greatly at low frequencies and slightly at high frequencies, may suppress the amplitude of the residual echo components efficiently while avoiding giving a strange suppression feeling at high frequencies.

Returning to FIG. 2, the second amplitude adjuster 14 of the mixer 9 is provided with the amplitude-randomized noise spectrum Nr[f] from the noise-amplitude randomizer 8 and the residual-echo suppression amount EG from the echo suppression amount decider 4. On the basis of these factors, the second amplitude adjuster 14 adjusts the amplitude of the spectrum components of the amplitude-randomized noise spectrum Nr[f].

More specifically, in accordance with formula (12), the second amplitude adjuster 14 weights the residual-echo suppression amount EG with the second frequency weighting factor W2[f] (dB) that varies with frequency, and thus, obtains a second residual-echo suppression amount g2[f]. The second frequency weighting factor W2[f] will be described later.

$$g2[f] = EG + W2[f] \text{ (dB)} \quad (12)$$

Next, the second amplitude adjuster 14, using the second residual-echo suppression amount g2[f], adjusts the amplitude of the amplitude-randomized noise spectrum Nr[f] in accordance with formula (13), and outputs the amplitude-adjusted noise spectrum Ns[f].

$$Ns[f] = 10^{g2[f]/20} \cdot Nr[f] \quad (13)$$

The amplitude-adjusted amplitude spectrum Ss[f] and the amplitude-adjusted noise spectrum Ns[f] are supplied to the adder 15. The adder 15 adds the amplitude-adjusted amplitude spectrum Ss[f] to the amplitude-adjusted noise spectrum Ns[f] in accordance with formula (14) and outputs a noise-mixed amplitude spectrum SN[f].

$$SN[f] = Ss[f] + Ns[f] \quad (14)$$

Figure 4:
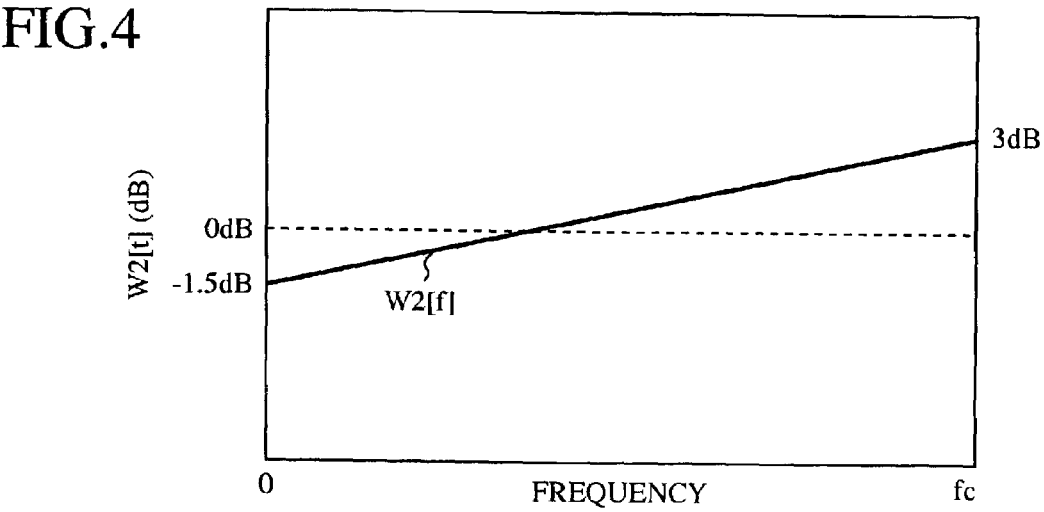
FIG. 4 is a graph showing a correlation between a second frequency weighting factor W2[f], which is used in a second amplitude adjuster of the mixer in FIG. 2, and frequency.

FIG. 4 shows a correlation between the second frequency weighting factor W2[f] and frequency. As shown in FIG. 4, with respect to the noise spectrum Ns[f], the weighting factor is small to suppress the amplitude of the noise spectrum slightly when frequency is low. When frequency is high, the weighting factor is large to suppress the amplitude of the noise spectrum greatly. This embodiment may permit a greater pseudo background noise to be mixed at low frequencies while permitting a less pseudo background noise to be mixed at high frequencies. Accordingly, the residual echo components, of which the power is strong at low frequencies, are incorporated into relatively strong background noise to be hardly discriminated.

The selector 16 of the mixer 9 in FIG. 2 is provided with the measurement of the residual-echo suppression amount EG and the filter-initial-stage flag EC_init. On the basis of these factors, the selector 16 decides an amplitude spectrum SNo[f] and outputs it from an output terminal selected in a manner represented by Table 3.

TABLE 3

| TERMINAL FOR OUTPUTTING | OUTPUT | CONDITION |
|---|---|---|
| 16A | SNo[f] = SN[f] | 12 dB < EG ≦ 24 dB (NEAR-END SPEECH |

TABLE 3-continued

| TERMINAL FOR OUTPUTTING | OUTPUT | CONDITION |
|---|---|---|
|  |  | SIGNAL IS LOW OR ONLY ECHO IS LOUD) |
| 16B | SNo[f] = Nr[f] | EC init is set (FILTER INITIAL STAGE) |
| 16C | SNo[f] = Ss[f] | EG = 6 dB (DOUBLE TALK) |

As shown in FIG. 2, the selector 16 includes three terminals 16A, 16B, and 16C. The selector 16 selects one of those terminals 16A, 16B, and 16C for outputting the amplitude spectrum SNo[f] in accordance with the condition represented in Table 3, and connects a switch 16D to the selected terminal.

As represented in Table 3, the terminal 16A is selected when the outgoing input signal Sd[t] involves only an echo without the near-end speech. This condition corresponds to condition 1 in Table 1. The selector 16 outputs the amplitude spectrum SN[f] including the amplitude-adjusted noise spectrum Ns[f] as the amplitude spectrum SNo[f].

The terminal 16B is selected when the filter-initial-stage flag EC_init is active. This condition is the filter initial stage where the filter factor h[n] of the adaptive filter 2 does not converge yet. Accordingly, the selector 16 outputs the amplitude-randomized noise spectrum Nr[f] as the amplitude spectrum SNo[f], instead of the noise-mixed amplitude spectrum SN[f]. This means that the amplitude spectrum SNo[f] is displaced by the amplitude-randomized noise spectrum Nr[f] (Noise displacement process).

The terminal 16C is selected when the residual-echo suppression amount EG is a prescribed value (6 dB). According to Table 1, this condition is condition 1 (double talk condition) where the outgoing input signal Sd[t] involves the near-end speech and the incoming input signal Rd[t] involves the far-end speech. In this case, the selector 16 outputs the amplitude-adjusted amplitude spectrum Ss[f] as the amplitude spectrum SNo[f]. As mentioned above, with regard to the amplitude-adjusted amplitude spectrum Ss[f], the amplitude of the residual echo is suppressed by the first amplitude adjuster 13, but the noise is not mixed therewith.

However, if the residual-echo suppression amount EG is 0 dB, the selector 16 does not select any of the terminals 16A, 16B, and 16C, so as not to output the amplitude spectrum SNo[f]. According to Table 1, this condition is condition 2 where the outgoing input signal Sd[t] involves the near-end speech and the incoming input signal Rd[t] does not involves the far-end speech, or condition 4 (silent condition) where both talkers do not emit voices.

The normalizer 17 is provided with the amplitude spectrum S[f] that is in the original form input to the mixer 9. When the mixer 9 outputs the amplitude spectrum SNo[f], the amplitude spectrum SNo[f] is also supplied to the normalizer 17.

When the selector 16 does not output the amplitude spectrum SNo[f] (when the residual-echo suppression amount EG is 0 dB), the normalizer 17 outputs the amplitude spectrum S[f] that is in the original form for the amplitude spectrum SNo[f].

On the other hand, when the selector 16 outputs the amplitude spectrum SNo[f], the normalizer 17 conducts normalization, such that the power of the amplitude spectrum SNo[f] to be output from the mixer 9 equals the power of the original amplitude spectrum S[f] input to the mixer 9.

Hence, the mixer 9 outputs the amplitude spectrum including the pseudo background noise when the outgoing input signal Sd[t] involves only an echo without the near-end speech. The mixer 9 outputs the amplitude-randomized noise spectrum at the filter initial stage. At the double talk condition, the mixer 9 outputs the amplitude-adjusted amplitude spectrum without mixing the background noise. When only the near-end talker talks or when the condition is silent, the mixer 9 outputs the amplitude spectrum, of which the amplitude is not adjusted, without mixing the background noise.

Returning to FIG. 1, the phase randomizer 10 is provided with the phase spectrum P[f] and the residual-echo suppression amount EG. The phase randomizer 10 randomizes the phase of the phase spectrum P[f] of each frame in accordance with one of formulae (15) through (17) on the basis of the residual-echo suppression amount EG, and outputs a phase-randomized phase spectrum Pr[f].

However, when the residual-echo suppression amount EG is equal to or less than a prescribed value (12 dB), the phase randomizer 10 does not randomize the phase. Thus, Pr[f]=P[f]. This condition corresponds to the double talk condition, silent condition, or exclusionary near-end speech condition (condition 1, 2, or 4 in Table 1). The reason for inexecution of the phase randomization at the silent condition is that the phase randomization is meaningless at this condition. The reason for inexecution of the phase randomization at the double talk condition and the exclusionary near-end speech condition is that the phase randomization of the near-end speech will give a strange feeling to the far-end talker when at least the near-end talker talks.

Resultingly, the phase randomizer 10 randomizes the phase at the filter initial condition (not shown in Table 1) or at the exclusionary far-end speech condition (condition 3 in Table 1). The phase randomizer 10 calculates the phase-randomized phase spectrum Pr[f] in accordance with one of formulae (15) through (17) on the basis of the residual-echo suppression amount EG.

As mentioned above, the residual-echo suppression amount EG is greater than 24 dB at the filter initial stage. In such a case, the phase randomizer 10 uses formula (15).

$$Pr[f]=P[f]\cdot\sin(\pi/4*RND(x)) \qquad (15)$$

where RND(x) is a function generating uniform random numbers within a range represented as follows:

$$-1.0 \leq RND(x) < 1.0$$

Each spectrum component of the phase spectrum P[f] within a frequency range between fc/2 and fc is subject to the calculation according to formula (15). As mentioned above, fc is the Nyquist frequency of the echo processor.

In condition 3, the residual-echo suppression amount EG from the echo suppression amount decider 4 is greater than 12 dB and equal to or less than 24 dB. The phase randomizer 10 uses formula (16) when 18 dB<EG≦24 dB.

$$Pr[f]=P[f]\cdot\sin(\pi/8*RND(x)) \qquad (16)$$

Each spectrum component of the phase spectrum P[f] within a frequency range between fc/4 and fc is subject to the calculation according to formula (16).

The phase randomizer 10 uses formula (17) when 12 dB<EG≦18 dB.

$$Pr[f]=P[f]\cdot\sin(\pi/16*RND(x)) \qquad (17)$$

Each spectrum component of the phase spectrum P[f] within a frequency range between fc/8 and fc is subject to the calculation according to formula (17).

It will be appreciated by those skilled in the art that the thresholds for discriminatively use formula (15), (16) or (17) are not limited to 24, 18, and 12 dB. The thresholds may be arbitrarily selected on the basis of the environment or other conditions where the echo processor is used.

As will be understood from the above description relating to Table 1, when the residual-echo suppression amount EG is large, the echo level to be suppressed is large relatively to the background noise level, and thus, the phase spectrum P[f] also includes significant echo components. If the residual-echo suppression amount EG is small, the phase spectrum P[f] includes background noise components that are large relatively to the echo components.

If a large amount of residual echo components are included in the phase spectrum, the naturalness of the pseudo ground noise is impaired. Accordingly, the phase randomizer 10 randomizes the phase of the phase spectrum in accordance with one of formulae (15) through formula (17) on the basis of the residual-echo suppression amount EG, thereby randomizing the pseudo background noise. Consequently, if the residual-echo suppression amount EG is large, the residual echo components mixed with the phase spectrum in the pseudo background noise are whitened and obscured acoustically.

On the other hand, if the residual-echo suppression amount EG is small, the phase randomizer 10 does not randomize the phase of the phase spectrum P[f], thereby maintaining the phase of the outgoing input signal and hence the naturalness of the pseudo background noise.

As described above, in relation to the amplitude spectrum S[f] of the outgoing input signal, the noise spectrum N[f] is estimated and mixed with the amplitude spectrum S[f]. However, the phase spectrum P[f] is not subject to a similar noise mixing process. Accordingly the phase spectrum of the outgoing input signal is maintained to generate a pseudo background noise with high naturalness.

The frequency-time transformer 11 is provided with the amplitude spectrum SNo[f] from the mixer 9, which might include pseudo background noise components, and the phase-randomized phase spectrum Pr[f] from the phase randomizer 10. The frequency-time transformer 11 transforms these frequency spectra SNo[f] and Pr[f] into an outgoing output signal So[t] in the time domain, and outputs the outgoing output signal So[t].

Figure 5:
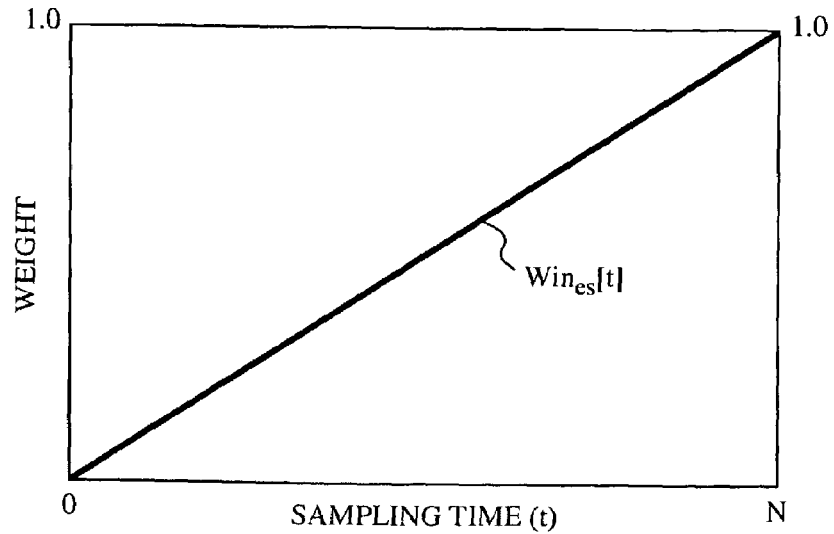
FIG. 5 is a graph illustrating a triangular window function $Win_{es}[t]$ used in a smoother of the echo processor in FIG. 1.

The smoother 12 smoothes the frames of the outgoing output signal So[t] from the frequency-time transformer 11, using formula (18) and the triangular window function $Win_{es}[t]$ represented in FIG. 5 in order to mitigate a sense of discontinuity caused by variation of the frames. The smoother 12 outputs an output signal Sout[t] resulting from the smoothing process.

$$Sout[t] = Win_{es}[t] \cdot So_{old}[t] + \qquad (18)$$
$$Win_{es}[N-t] \cdot So[t]$$

where $So_{old}[t]$ is the outgoing output signal So[t] of the last frame and N is the maximum of sampling time t corresponding to the frame length. Thus, the sampling time using the triangular window function $Win_{es}[t]$ is from zero to N.

Figure 6:
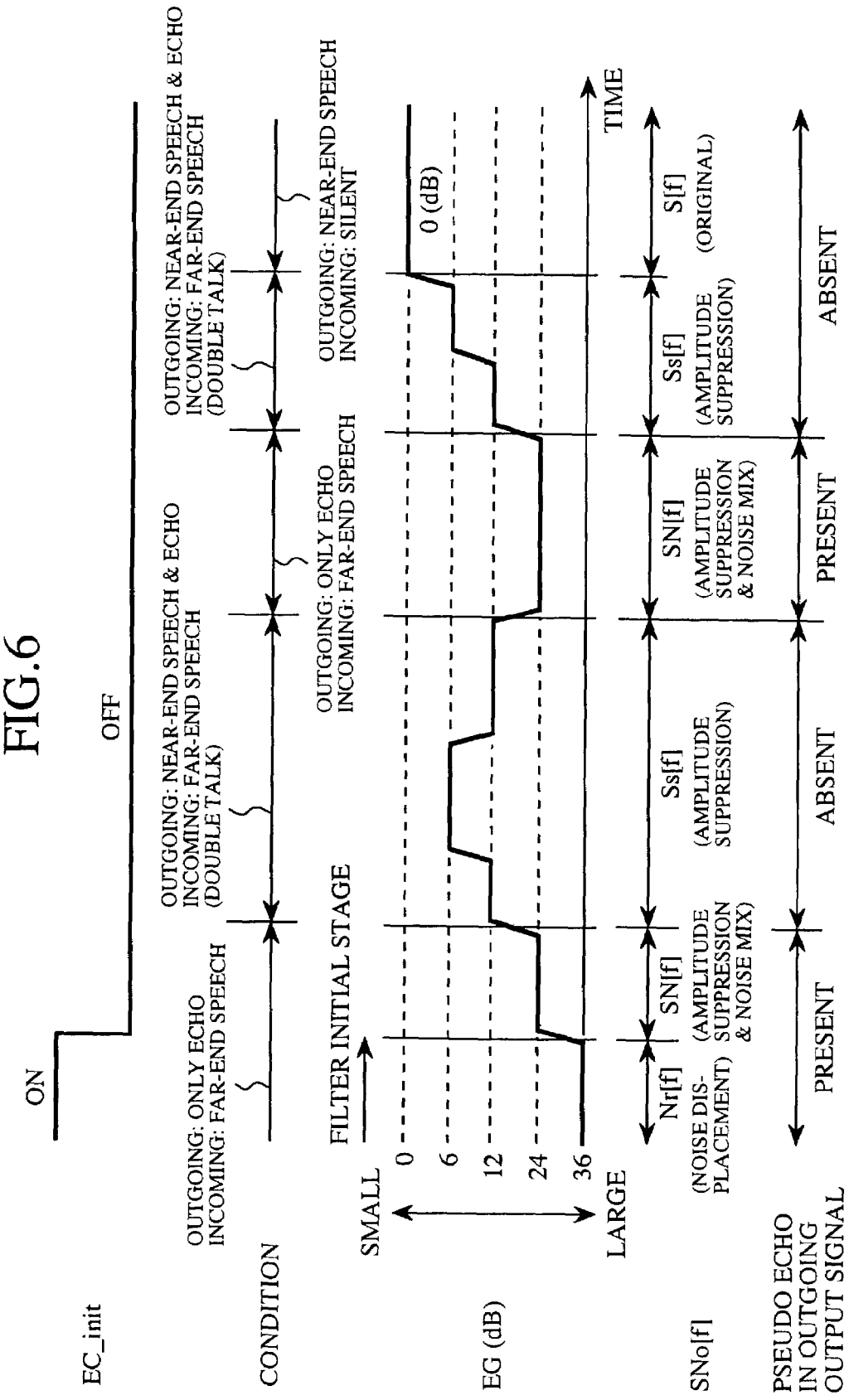
FIG. 6 is a time chart showing states of the outgoing signal and the incoming signal in the echo processor in FIG. 1, a residual-echo suppression amount based on the states, and operational states of the pseudo background noise generator based on the residual-echo suppression amount.

FIG. 6 is a time chart showing operational states of the pseudo background noise generator 30 in relation to states of the outgoing signal to be transmitted from the echo processor and the incoming signal received in the echo processor, and the residual-echo suppression amount based on both states. The above-described operations will be understood more easily from FIG. 6.

In summary, if the outgoing signal involves only an echo, the amplitude suppression and noise mix processes are executed. If the outgoing signal involves the near-end speech and an echo (double-talk condition), only the amplitude suppression process is executed. At the filter initial stage where the filter-initial-stage flag EC_init is activated, the noise-displacement process is executed.

In the above-described embodiment, only when the filter-initial-stage flag EC_init is activated, the terminal 16B of the selector 16 is selected in accordance with Table 3, so that the amplitude spectrum SNo[f] output from the selector 16 is set to the noise spectrum Nr[f] of which the amplitude is randomized, but not adjusted.

In an alternative embodiment, the terminal 16B may be also selected in other situations. For example, if the residual-echo suppression amount EG is greater than a prescribed value, e.g., 20 dB, the terminal 16B may be selected to execute the noise displacement process. The reason is that when the residual-echo suppression amount EG is large in some measure, the level of background noise is low in relation to the residual echo in the outgoing input signal, so that the echo is likely audible prominently by the far-end talker. In addition, when the residual-echo suppression amount EG is large, the near-end speech is absent while the far-end speech is present, and thus the noise displacement process will not be a disturbance of conversation.

In another alternative embodiment, the terminal 16B may be excluded and the selector 16 may output the amplitude-adjusted noise spectrum Ns[f] instead of the amplitude-randomized noise spectrum Nr[f] of which the amplitude is not adjusted. More specifically, when the filter-initial-stage flag EC_init is activated or when the residual-echo suppression amount EG is greater than the prescribed value, e.g., 20 dB, the amplitude-adjusted noise spectrum Ns[f] may be used as the output amplitude spectrum SNo[f]. In this modification, in order to mix a relatively large amount of pseudo background noise components with the outgoing signal, the second amplitude adjuster 14 preferably subtracts a value from the second residual-echo suppression amount g2[f] calculated in accordance with formula (12), so as to reduce the amplitude suppression amount of the noise spectrum and to increase the proportion of the level of noise components to the residual echo in the outgoing input signal.

Although the echo processor in the above-described embodiment includes the echo cancel unit 1, the echo processor may exclude the echo cancel unit 1 in still another alternative embodiment. The outgoing input signal Sd[t] may be directly input to the time-frequency transformer 5 in the alternative embodiment. Since the adaptive filter 2 is resultingly deleted, the selector 16 does not execute the selection on the basis of the filter-initial-stage flag EC_init.

As described above, in accordance with the first embodiment, while the noise spectrum N[f] is estimated from the amplitude spectrum S[f] of the outgoing input signal and the processed noise spectrum Ns[f] or Nr[f] is mixed with the amplitude spectrum S[f], the phase spectrum P[f] of the outgoing input signal is not mixed with noise components. Since the phase spectrum of the outgoing input signal is mostly maintained, the echo processor can generate a pseudo background noise with high naturalness that is comfortable for a sense of hearing.

While the speech/noise decider 6 makes the speech/noise decision on the outgoing input signal, the noise-spectrum estimator 7 estimates the noise spectrum from each frame that is decided to involve a noise mainly. In addition, the noise-amplitude randomizer 8 randomizes the background noise spectrum components. Accordingly, the resulting noise spectrum is stable with respect to time and frequency, and the echo processor can generate an appropriate pseudo background noise with high naturalness that depends on conditions and is comfortable for a sense of hearing.

Furthermore, as the residual-echo suppression amount EG increases, the phase randomizer 10 increases the degree of randomization of the phase spectrum of the outgoing input signal and extends the subject frequency range of the phase randomization to lower frequencies, so that the outgoing output signal So[t] becomes similar to a white noise. As a result, the residual echo components in the outgoing input signal also becomes similar to the background noise to be obscured acoustically. On the other hand, if the residual-echo suppression amount EG is small, the phase randomizer 10 does not randomize the phase of the phase spectrum P[f], thereby maintaining the phase of the outgoing input signal and hence the naturalness of sound.

In addition, if the residual-echo suppression amount EG is greater than the threshold, the mixer 9 enhances the amount of the noise spectrum mixed with the amplitude-adjusted amplitude spectrum Ss[f] or displaces the amplitude spectrum by the noise spectrum. Therefore, even if the echo cancel unit 1 does not cancel echoes sufficiently, the residual echoes may be eliminated and the pseudo background noise may be mixed.

Furthermore, until the filter factor of the adaptive filter 2 converges, the adaptive filter 2 outputs the filter-initial-stage flag EC_init for controlling the pseudo background noise generator 30 to displace the amplitude spectrum with the noise spectrum. Therefore, the residual echo components may be eliminated completely, and the pseudo background noise that is comfortable for a sense of hearing can be transmitted.

Furthermore, the mixer 9 increases the proportion of the level of mixed noise spectrum to the amplitude spectrum of the outgoing input signal when the residual-echo suppression amount EG is large. The mixer 9 decreases the proportion when the residual-echo suppression amount EG is small. Therefore, the echo processor can mix a suitable level of the pseudo background noise depending upon the residual echo level and the levels of the outgoing and incoming signals.

In addition, the embodiment increases the level of the pseudo background noise at low frequencies and decreases the level at high frequencies. Therefore, this embodiment may efficiently suppress the amplitude of the residual echo components, which is greater at low frequencies, while avoiding giving a strange suppression feeling at high frequencies.

Second Embodiment

In the first embodiment, the phase randomizer 10 randomizes the phase spectrum of the outgoing input signal.

Alternatively, a second embodiment of the present embodiment described below randomizes the amplitude of the amplitude spectrum of the outgoing input signal to accomplish a similar advantage.

Figure 7:
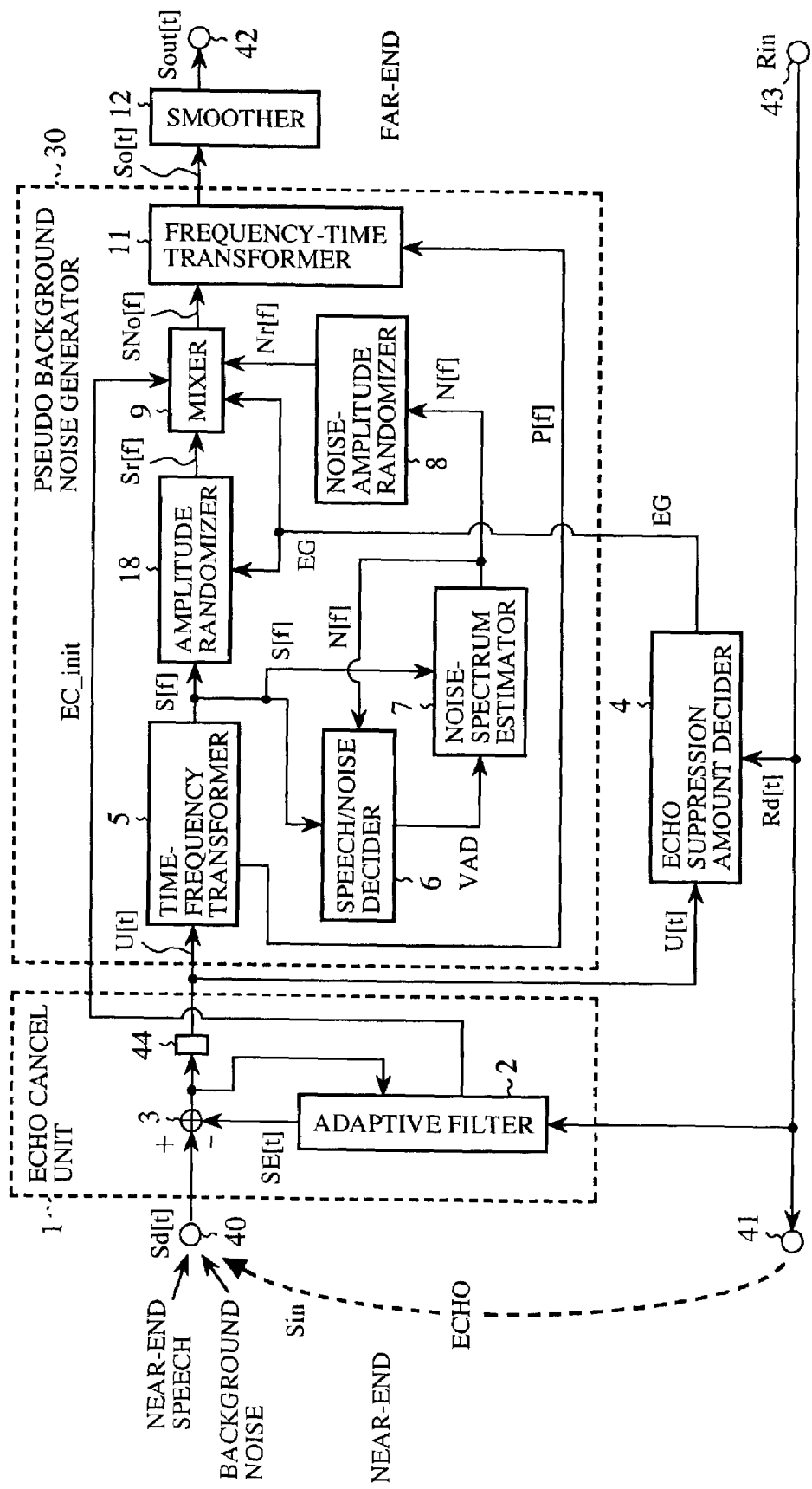
FIG. 7 is a block diagram illustrating the structure of an echo processor according to a second embodiment of the present invention.

FIG. 7 is a block diagram illustrating the structure of an echo processor according to the second embodiment of the present invention. The difference between the structures shown in FIGS. 1 and 7 is that the echo processor in FIG. 7 includes an amplitude randomizer 18 instead of the phase randomizer 10. Other structural elements, which are the same as those in FIG. 1, will not be described in detail.

Operations of the echo processor will be described next. Differently from the first embodiment, the amplitude spectrum S[f] is supplied from the time-frequency transformer 5 to the amplitude randomizes 18 interposed between the time-frequency transformer 5 and the mixer 9. The amplitude randomizer 18 is also provided with the residual-echo suppression amount EG from the echo suppression amount decider 4. The amplitude randomizer 18 randomizes the amplitude components of the amplitude spectrum S[f] of each frame in accordance with one of formulae (19) through (21) on the basis of the residual-echo suppression amount EG, and thus obtains an amplitude-randomized amplitude spectrum Sr[f].

However, when the residual-echo suppression amount EG is equal to or less than a prescribed value (12 dB), the amplitude randomizer 18 does not randomize the amplitude. Thus, Sr[f]=S[f]. This condition corresponds to the double talk condition, silent condition, or exclusionary near-end speech condition (condition 1, 2, or 4 in Table 1). The reason for inexecution of the amplitude randomization at the silent condition is that the amplitude randomization is meaningless at this condition. The reason for inexecution of the amplitude randomization at the double talk condition or exclusionary near-end speech condition is that the amplitude randomization of the near-end speech will give a strange feeling to the far-end talker when at least the near-end talker talks.

Resultingly, the amplitude randomizer 18 randomizes the amplitude at the filter initial condition (not shown in Table 1) or at the exclusionary far-end speech condition (condition 3 in Table 1). The amplitude randomizer 18 calculates the amplitude-randomized amplitude spectrum Sr[f] in accordance with one of formulae (19) through (21) on the basis of the residual-echo suppression amount EG.

$$Sr[f] = S[f] \cdot gr1[f] \qquad (19)$$
$$= S[f] \cdot (1.0 + 0.25 \cdot RND(x))$$

where gr1[f] is a random gain while RND(x) is a function generating uniform random numbers within a range represented as follows:

$$-1.0 \leq RND(x) < 1.0$$

Each spectrum component of the amplitude spectrum S[f] within a frequency range between fc/2 and fc is subject to the calculation according to formula (19). As mentioned above, fc is the Nyquist frequency of the echo processor.

In condition 3 in Table 3, the residual-echo suppression amount EG from the echo suppression amount decider 4 is greater than 12 dB and equal to or less than 24 dB. The amplitude randomizer 18 uses formula (20) when 18 dB<EG≦24 dB.

$$Sr[f] = S[f] \cdot gr2[f] \qquad (20)$$
$$= S[f] \cdot (1.0 + 0.125 \cdot RND(x))$$

Each spectrum component of the amplitude spectrum S[f] within a frequency range between 3fc/4 and fc is subject to the calculation according to formula (20).

The amplitude randomizer 18 uses formula (17) when 12 dB<EG≦18 dB.

$$Sr[f] = S[f] \cdot gr3[f] \qquad (21)$$
$$= S[f] \cdot (1.0 + 0.0625 \cdot RND(x))$$

Each spectrum component of the amplitude spectrum S[f] within a frequency range between 7fc/8 and fc is subject to the calculation according to formula (21).

As will be understood from formulae (19) through (21), when the residual-echo suppression amount EG is less than 18 dB, the amplitude randomizer 18 randomizes the spectrum components at higher frequencies with a small degree of randomization. When the residual-echo suppression amount EG is equal to or greater than 18 dB, the amplitude randomizer 18 randomizes the spectrum components at lower frequencies as well as higher frequencies with a great degree of randomization.

It will be appreciated by those skilled in the art that the thresholds for discriminatively use formula (19), (20) or (21) are not limited to 24, 18, and 12 dB. The thresholds may be arbitrarily selected on the basis of the environment or other conditions where the echo processor is used.

As will be understood from the above description relating to Table 1, when the residual-echo suppression amount EG is large, the echo level to be suppressed is large relatively to the background noise level, and thus, the amplitude spectrum S[f] also includes significant echo components. If the residual-echo suppression amount EG is small, the amplitude spectrum S[f] includes background noise components significantly in relation to the echo components.

If a large amount of residual echo components are included in the amplitude spectrum, the naturalness of the pseudo ground noise is impaired. Accordingly, the amplitude randomizer 18 randomizes the amplitude of the amplitude spectrum in accordance with one of formulae (19) through formula (21) on the basis of the residual-echo suppression amount EG, thereby randomizing the pseudo background noise. Consequently, if the residual-echo suppression amount EG is large, the residual echo components mixed with the amplitude spectrum in the pseudo background noise are obscured acoustically.

On the other hand, if the residual-echo suppression amount EG is small, the amplitude randomizer 18 does not randomize the amplitude of the amplitude spectrum S[f], thereby maintaining the amplitude of the outgoing input signal and hence the naturalness of the pseudo background noise.

The amplitude-randomized amplitude spectrum Sr[f] prepared by the amplitude randomizer 18 is supplied to the mixer 9. The mixer 9 is also provided with the amplitude-randomized noise spectrum Nr[f], the filter-initial-stage flag EC_init, and the residual-echo suppression amount EG.

The structural elements and functions of the mixer 9 are substantially equivalent to those in the first embodiment. In other words, the structural elements and functions of the mixer 9 will be understood by those skilled in the art when "amplitude spectrum S[f]" in the description of the mixer 9 in the first embodiment is read for "amplitude-randomized amplitude spectrum Sr[f]."

Hence, the selector 16 (FIG. 2) in the mixer 9 selects the terminal 16A for outputting the amplitude spectrum SN[f] including the pseudo background noise as the output amplitude spectrum SNo[f] when the outgoing input signal Sd[t] involves only an echo without the near-end speech. The selector 16 selects the terminal 16B for outputting the amplitude-randomized noise spectrum Nr[f] as the output amplitude spectrum SNo[f] at the filter initial stage. At the double talk condition, the selector 16 selects the terminal 16C for outputting the amplitude-adjusted amplitude spectrum Ss[f] without mixing the background noise. When only the near-end talker talks or when the condition is silent, the mixer 9 outputs the amplitude-randomized amplitude spectrum Sr[f], of which the amplitude is not adjusted, without mixing the background noise.

Thus, the frequency-time transformer 11 is provided with the amplitude spectrum SNo[f], which might include pseudo background noise components. Since the second embodiment does not include the phase randomizer 10 (FIG. 1), the phase spectrum P[f] is directly supplied from the time-frequency transformer 5 to the frequency-time transformer 11. The frequency-time transformer 11 transforms these frequency spectra SNo[f] and P[f] into an outgoing output signal So[t] in the time domain, and outputs the outgoing output signal So[t]. Operations of the other structural elements are the same as those in the first embodiment.

As described above, in accordance with the second embodiment, while the noise spectrum N[f] is estimated from the amplitude spectrum S[f] of the outgoing input signal and the processed noise spectrum Ns[f] or Nr[f] is mixed with the amplitude spectrum Sr[f], the phase spectrum P[f] of the outgoing input signal is not mixed with noise components. Since the phase spectrum of the outgoing input signal is maintained, the echo processor can generate a pseudo background noise with high naturalness that is comfortable for a sense of hearing.

While the speech/noise decider 6 makes the speech/noise decision on the outgoing input signal, the noise-spectrum estimator 7 estimates the noise spectrum from each frame that is decided to involve a noise. In addition, the noise-amplitude randomizer 8 randomizes the background noise spectrum components. Accordingly, the resulting noise spectrum is stable with respect to time and frequency, and the echo processor can generate an appropriate pseudo background noise with high naturalness that depends on conditions and is comfortable for a sense of hearing.

Furthermore, as the residual-echo suppression amount EG increases, the amplitude randomizer 18 increases the degree of randomization of the phase spectrum of the outgoing input signal and extends the subject frequency range of the phase randomization to lower frequencies, so that the outgoing output signal So[t] becomes similar to a white noise. As a result, the residual echo components in the outgoing input signal also becomes similar to the background noise to be obscured acoustically. On the other hand, if the residual-echo suppression amount EG is small, the amplitude randomizer 18 does not randomize the amplitude of the amplitude spectrum S[f], thereby maintaining the naturalness of sound.

Third Embodiment

In the first and second embodiments, each spectrum component of the amplitude spectrum S[f] throughout the frequency range between zero and fc is subject to the amplitude suppression of the amplitude spectrum S[f] or the amplitude-randomized amplitude spectrum Sr[f] at the first amplitude adjuster 13 (FIG. 2) and the amplitude suppression of the noise spectrum N[f] at the second amplitude adjuster 14 (FIG. 2). Alternatively, a third embodiment of the present embodiment described below may suppress the amplitude of spectrum components within a part of the entire range, e.g., middle or low frequencies less than 3 kHz.

When only middle or low frequencies are subject to the amplitude suppression, the echo processor may sufficiently suppresses the amplitude of residual echo, of which the power is strong at only low frequencies for voice components, while avoiding giving a strange suppression feeling at high frequencies.

Fourth Embodiment

The first through third embodiments may be modified as in a fourth embodiment where the amplitude of the amplitude-randomized noise spectrum Nr[f] from the noise-amplitude randomizer 8 may be randomized in accordance with the background noise level.

Figure 8:
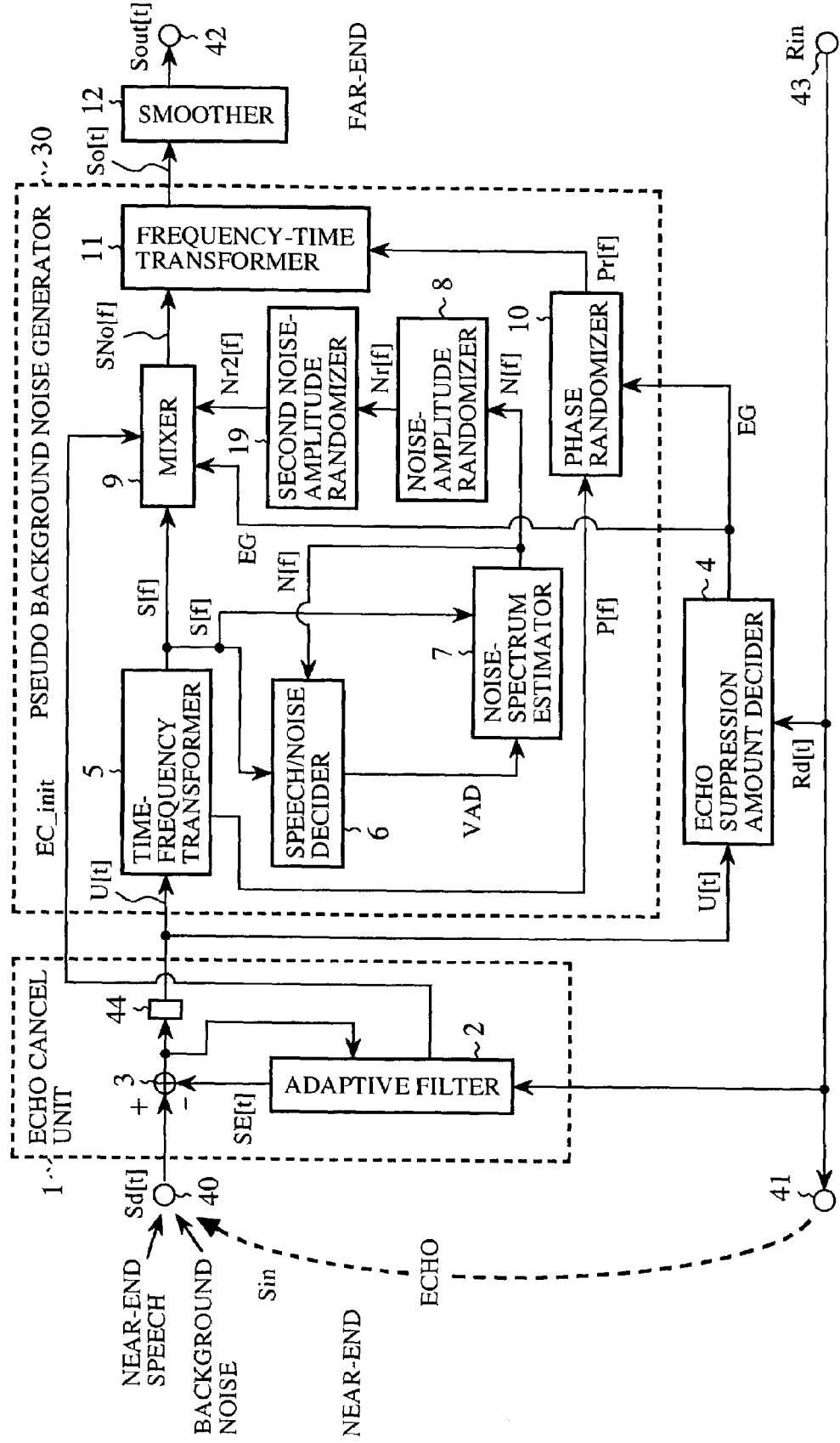
FIG. 8 is a block diagram illustrating the structure of an echo processor according to a fourth embodiment of the present invention.

FIG. 8 is a block diagram illustrating the structure of an echo processor according to the fourth embodiment of the present invention. The structure shown in FIG. 8 is basically similar to that shown in FIG. 1, except for including a second noise-amplitude randomizer 19. Other structural elements, which are the same as those in FIG. 1, will not be described in detail.

Operations of the echo processor will be described next. The amplitude-randomized noise spectrum Nr[f] is supplied from the noise-amplitude randomizer 8 to the second noise-amplitude randomizer 19. The second noise-amplitude randomizer 19 measures the power Npow(dB) of the amplitude-randomized noise spectrum Nr[f]. Alternatively, the echo suppression amount decider 4 that measures the power of frames for calculating the background noise level may supply the measurement results to the second noise-amplitude randomizer 19.

On the basis of the power Npow, the second noise-amplitude randomizer 19 further randomizes the amplitude at a frequency range of the amplitude-randomized noise spectrum Nr[f] that has been already randomized by the noise-amplitude randomizer 8, and outputs a further randomized noise spectrum Nr2[f]. For the randomization, the second noise-amplitude randomizer 19 uses one of formula (22) through formula (24). When the power Npow is less than 60 dB, formula (22) is applied.

$$Nr2[f] = Nr[f] \cdot gr11[f] \quad (22)$$
$$= Nr[f] \cdot (1.0 + 0.25 \cdot RND(x))$$

where gr11[f] is a random gain while RND(X) is a function generating uniform random numbers within a range represented as follows:

$$-1.0 \leq RND(x) < 1.0$$

Each spectrum component of the amplitude spectrum S[f] within a frequency range between fc/2 and fc is subject to the calculation according to formula (22). As mentioned above, fc is the Nyquist frequency of the echo processor.

if the power Npow is greater than 40 dB and equal to or less than 60 dB, the second noise-amplitude randomizer 19 uses formula (23).

$$Nr2[f] = Nr[f] \cdot gr12[f] \qquad (23)$$
$$= Nr[f] \cdot (1.0 + 0.125 \cdot RND(x))$$

Each spectrum component of the amplitude spectrum S[f] within a frequency range between 3fc/4 and fc is subject to the calculation according to formula (23).

The second noise-amplitude randomizer 19 uses formula (24) when the power Npow is greater than 30 dB and equal to or less than 40 dB.

$$Nr2[f] = Nr[f] \cdot gr13[f] \qquad (24)$$
$$= Nr[f] \cdot (1.0 + 0.0625 \cdot RND(x))$$

Each spectrum component of the amplitude spectrum S[f] within a frequency range between 7fc/8 and fc is subject to the calculation according to formula (24).

As will be understood from formulae (22) through (24), when the power Npow of the noise spectrum is small, the second noise-amplitude randomizer 19 randomizes the spectrum components at higher frequencies with a small degree of randomization. When the power Npow is large, the second noise-amplitude randomizer 19 randomizes the spectrum components at lower frequencies as well as higher frequencies with a great degree of randomization.

It will be appreciated by those skilled in the art that the thresholds for discriminatively use formula (22), (23) or (24) are not limited to 30, 40, and 60 dB. The thresholds may be arbitrarily selected on the basis of the environment or other conditions where the echo processor is used.

As the background noise level, i.e., the power of the noise spectrum increases, the signal-to-noise ratio of the outgoing input signal decreases, thereby deteriorating the precision of the decision at the speech/noise decider 6. For example, a speech may be erroneously determined to be a noise.

According to the embodiment, which extends the degree and the frequency range of the amplitude randomization of the noise spectrum as the background noise level increases, the background noise becomes similar to a white noise. Therefore, the residual echo can be whitened and obscured acoustically although the residual echo components are falsely mixed with the noise spectrum for the reason of, e.g., the erroneous decision by the speech/noise decider 6. The amplitude-randomized noise spectrum Nr2[f] is supplied from the second noise-amplitude randomizer 19 to the mixer 9.

As described above, in accordance with the fourth embodiment, the degree and the frequency range of the amplitude randomization of the noise spectrum can be adjusted as the background noise level varies. For example, as the background noise increases, the background noise becomes similar to a white noise. Consequently, the residual echo can be whitened and obscured acoustically although the residual echo components are falsely mixed with the noise spectrum.

Fifth Embodiment

Figure 9:
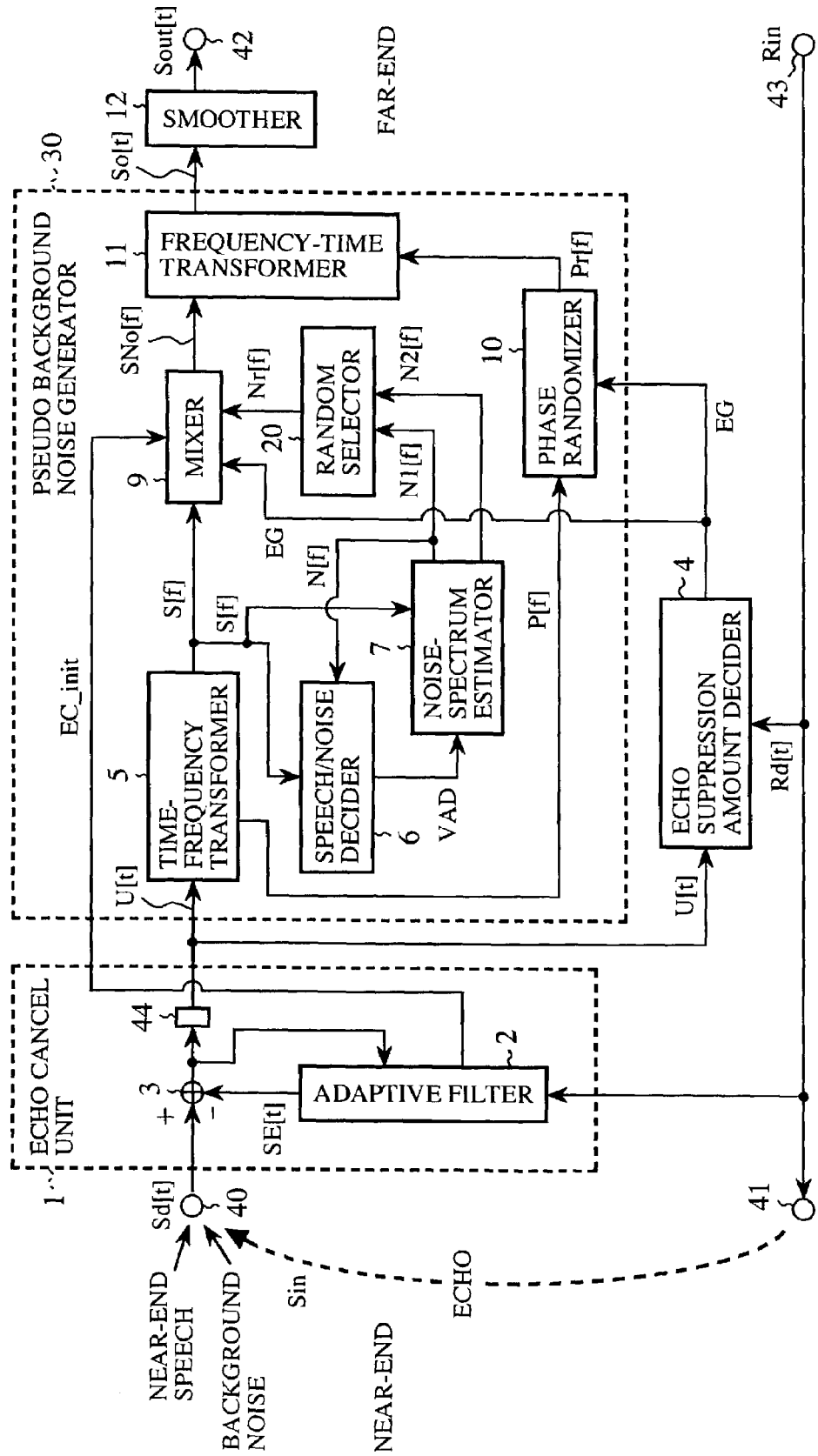
FIG. 9 is a block diagram illustrating the structure of an echo processor according to a fifth embodiment of the present invention.

FIG. 9 is a block diagram illustrating the structure of an echo processor according to a fifth embodiment of the present invention. The echo processor illustrated in FIG. 9 includes a random selector 20 instead of the noise-amplitude randomizer 8 in FIG. 1. Other structural elements, which are the same as those in FIG. 1, will not be described in detail.

Operations of the echo processor will be described next. In this embodiment, the noise-spectrum estimator 7 outputs two estimated noise spectra N1[f] and N2[f]. The noise-spectrum estimator 7 is provided with the speech/noise decision signal and the amplitude spectrum S[f]. If the speech/noise decision signal VAD is 0 (input sound involves a noise mainly), the noise-spectrum estimator 7 estimates a first estimated noise spectrum N1[f] that is an average spectrum of the background noise included in the input signal in accordance with formula (25).

$$N1[f] = (1-C1) \cdot S[f] + C1 \cdot N1_{old}[f] \qquad (25)$$

where $N1_{old}[f]$ is an average of the first estimated noise spectra estimated from frames that were determined to involve noises mainly in the past. $N1_{old}[f]$ is stored in a memory inside the noise-spectrum estimator 7. C1 is a constant, e.g., 0.9, which is determined suitably as a factor for deciding the renewal ratio of the first estimated noise spectrum N1[f].

On the other hand, if the speech/noise decision signal VAD is 1 (input sound includes a speech), the noise-spectrum estimator 7 estimates the first estimated noise spectrum N1[f] in accordance with formula (7). In this case, the noise-spectrum estimator 7 uses the old first estimated noise spectrum $N1_{old}[f]$ for the first estimated noise spectrum N1[f] of the current frame.

$$N1[f] = N1_{old}[f] \qquad (26)$$

In either event, after the estimation of the first estimated noise spectrum N1[f], the noise-spectrum estimator 7 renews the old first estimated noise spectrum $N1_{old}[f]$ in its inside memory by replacing the old first estimated noise spectrum $N1_{old}[f]$ with the estimated first estimated noise spectrum N1[f] of the current frame as represented by formula (8).

$$N1_{old}[f] = N1[f] \qquad (27)$$

The current first estimated noise spectrum N1[f] is supplied to the speech/noise decider 6 and the random selector 20.

The speech/noise decider 6, as well as the noise-spectrum estimator 7, renews the old first estimated noise spectrum $N1_{old}[f]$ in its inside memory by replacing the old first estimated noise spectrum $N1_{old}[f]$ with the estimated current first estimated noise spectrum N1[f] as represented by formula (27).

The noise-spectrum estimator 7 outputs a second estimated noise spectrum N2[f] in addition to the first estimated noise spectrum N1[f]. If the speech/noise decision signal VAD is 0 (input sound involves a noise mainly), the noise-spectrum estimator 7 estimates a second estimated noise spectrum N2[f] in accordance with formula (28).

$$N2[f] = (1-C2) \cdot S[f] + C2 \cdot N2_{old}[f] \qquad (28)$$

where $N2_{old}[f]$ is an average of the second estimated noise spectra estimated from frames that were determined to involve noises mainly in the past. $N2_{old}[f]$ is also stored in the memory inside the noise-spectrum estimator 7. C2 is a constant, e.g., 0.8, which is determined suitably as a factor for deciding the renewal ratio of the second estimated noise spectrum N2[f]. Accordingly, the renewal ratio of the second estimated noise spectrum N2[f] is greater in relation to the first estimated noise spectrum N1[f]. In addition, the amplitude of the second estimated noise spectrum N2[f] differs from that of the first estimated noise spectrum N1[f].

On the other hand, if the speech/noise decision signal VAD is 1 (input sound includes a speech), the noise-spectrum estimator 7 estimates the second estimated noise spectrum N2[f] in accordance with formula (29). In this case, the noise-spectrum estimator 7 uses the old second estimated noise spectrum $N2_{old}[f]$ for the second estimated noise spectrum N2[f] of the current frame.

$$N2[f]=N2_{old}[f] \quad (29)$$

In either event, after the estimation of the second estimated noise spectrum N2[f], the noise-spectrum estimator 7 renews the old second estimated noise spectrum $N2_{old}[f]$ in its inside memory by replacing the old second estimated noise spectrum $N2_{old}[f]$ with the estimated second estimated noise spectrum N2[f] of the current frame as represented by formula (30).

$$N2_{old}[f]=N2[f] \quad (30)$$

The second estimated noise spectrum N2[f] is supplied to the random selector 20.

On the basis of the first estimated noise spectrum N1[f] and second estimated noise spectrum N2[f], the random selector 20 produces an amplitude-randomized noise spectrum Nr[f] and output it. Frames differ from one another in the shape of the spectrum Nr[f].

The random selector 20 may perform a random function Prob(x) of which the odds of outputting one is x %. At the determination of the noise spectrum Nr[f], the random selector 20 performs a random function Prob(50) of which the odds of outputting one is 50%.

More specifically, if the output of the random function Prob(50) is one, the random selector 20 outputs the first estimated noise spectrum N1[f]. Otherwise, the random selector 20 outputs the second estimated noise spectrum N2[f]. The noise spectrum Nr[f] thus obtained is supplied to mixer 9. Operations of the other structural elements are the same as those in the first embodiment.

As described above, the fifth embodiment selects one of the noise spectra N1[f] and N2[f], which estimated at different renewal rates, randomly at each frame, thereby deciding the amplitude-randomized noise spectrum Nr[f]. Accordingly, while the naturalness of the noise spectrum can be maintained, it is possible to enhance the randomicity of the noise spectrum to be mixed with the amplitude spectrum. Therefore, the echo processor can generate a pseudo background noise with high naturalness that is comfortable for a sense of hearing.

Sixth Embodiment

Figure 10:
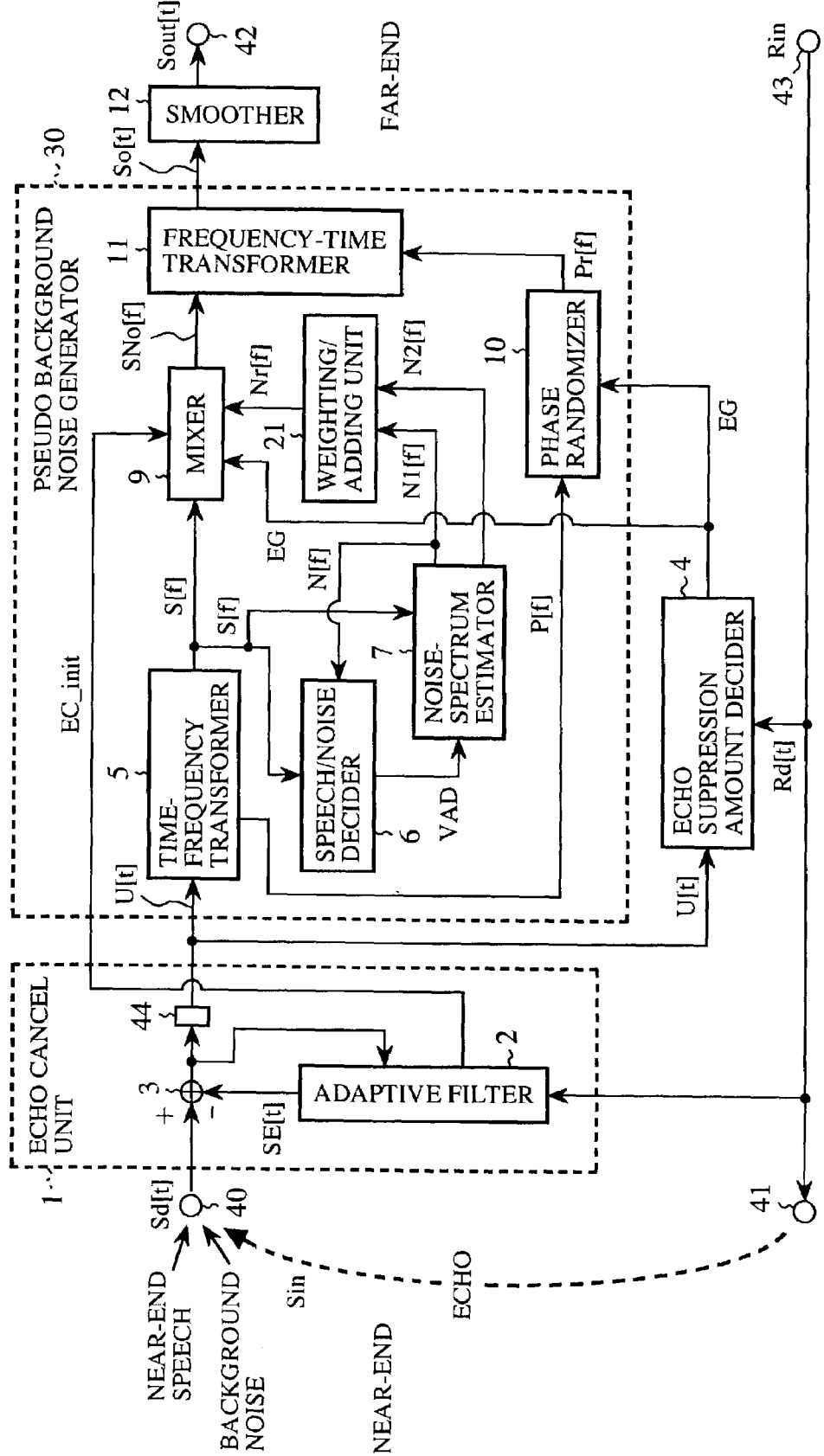
FIG. 10 is a block diagram illustrating the structure of an echo processor according to a sixth embodiment of the present invention.

FIG. 10 is a block diagram illustrating the structure of an echo processor according to a sixth embodiment of the present invention. The echo processor according to the sixth embodiment is a modification of the fifth embodiment shown in FIG. 9, and includes a weighting/adding unit 21 instead of the random selector 20 in FIG. 9. Other structural elements, which are the same as those in FIG. 9, will not be described in detail.

The weighting/adding unit 21 is provided with the first estimated noise spectrum N1[f] and the second estimated noise spectrum N2[f]. As described in conjunction with the fifth embodiment, the renewal ratio of the second estimated noise spectrum N2[f] is greater in relation to the first estimated noise spectrum N1[f]. The weighting/adding unit 21 executes weighting each of the noise spectra N1[f] and N2[f], and adds the weighted noise spectra N1[f] and N2[f] to each other, thereby outputting the resulting noise spectrum Nr[f] of which the amplitude is randomized.

The weighting/adding unit 21 may perform a random function Prob(x) of which the odds of outputting one is x %. At the determination of the noise spectrum Nr[f], the weighting/adding unit 21 performs a random function Prob(50) of which the odds of outputting one is 50%.

More specifically, if the output of the random function Prob(50) is one, the weighting/adding unit 21 applies formula (31) to each spectrum component within a frequency range between zero and the Nyquist frequency fc.

$$Nr[f]=C3 \cdot N1[f]+(1-C3) \cdot N2[f] \quad (31)$$

where C3 is a weighting factor that is a random variable calculated by formula (32).

$$C3=0.7+0.1 \cdot RND(x) \quad (32)$$

where RND(x) is a function generating uniform random numbers within a range represented as follows:

$$-1.0 \leq RND(x) < 1.0$$

As will be apparent from formula (32), weighting factor C3 varies within a range which is equal to or greater than 0.6 and is equal to or less than 0.8. However, the first term "0.7" may be replaced with another constant number.

When the output of the random function Prob(50) is not one, the weighting/adding unit 21 applies formula (33) to each spectrum component within a frequency range between zero and the Nyquist frequency fc.

$$Nr[f]=(1-C3) \cdot N1[f]+C3 \cdot N2[f] \quad (33)$$

Thus, the weighting/adding unit 21 produces an amplitude-randomized noise spectrum, i.e., weighted mean noise spectrum Nr[f] and output it. Frames differ from one another in the shape of the spectrum Nr[f]. The amplitude-randomized noise spectrum Nr[f] is supplied to the mixer 9. Operations of the other structural elements are the same as those in the fifth embodiment.

As described above, in accordance with the sixth embodiment, the noise spectrum Nr[f] to be mixed with the amplitude spectrum S[f] is obtained by weighting and adding a plurality of noise spectra N1[f] and N2[f] having different renewal ratios. Accordingly, while the frequency characteristic (spectrum shape) of the noise spectrum Nr[f] can be maintained approximately, the amplitude of the noise spectrum Nr[f] can be randomized with respect to time. Thus, the echo processor can generate a pseudo background noise that is comfortable for a sense of hearing.

Additionally, since each frequency component of the noise spectrum Nr[f] is obtained by weighting and adding spectrum component of the noise spectra N1[f] and N2[f] having different renewal ratios, the amplitude of the noise spectrum Nr[f] can be also randomized with respect to frequency while the frequency characteristic (spectrum shape) of the noise spectrum Nr[f] can be maintained approximately. Thus, the echo processor can generate a pseudo background noise with high naturalness that is comfortable for a sense of hearing.

Seventh Embodiment

Figure 11:
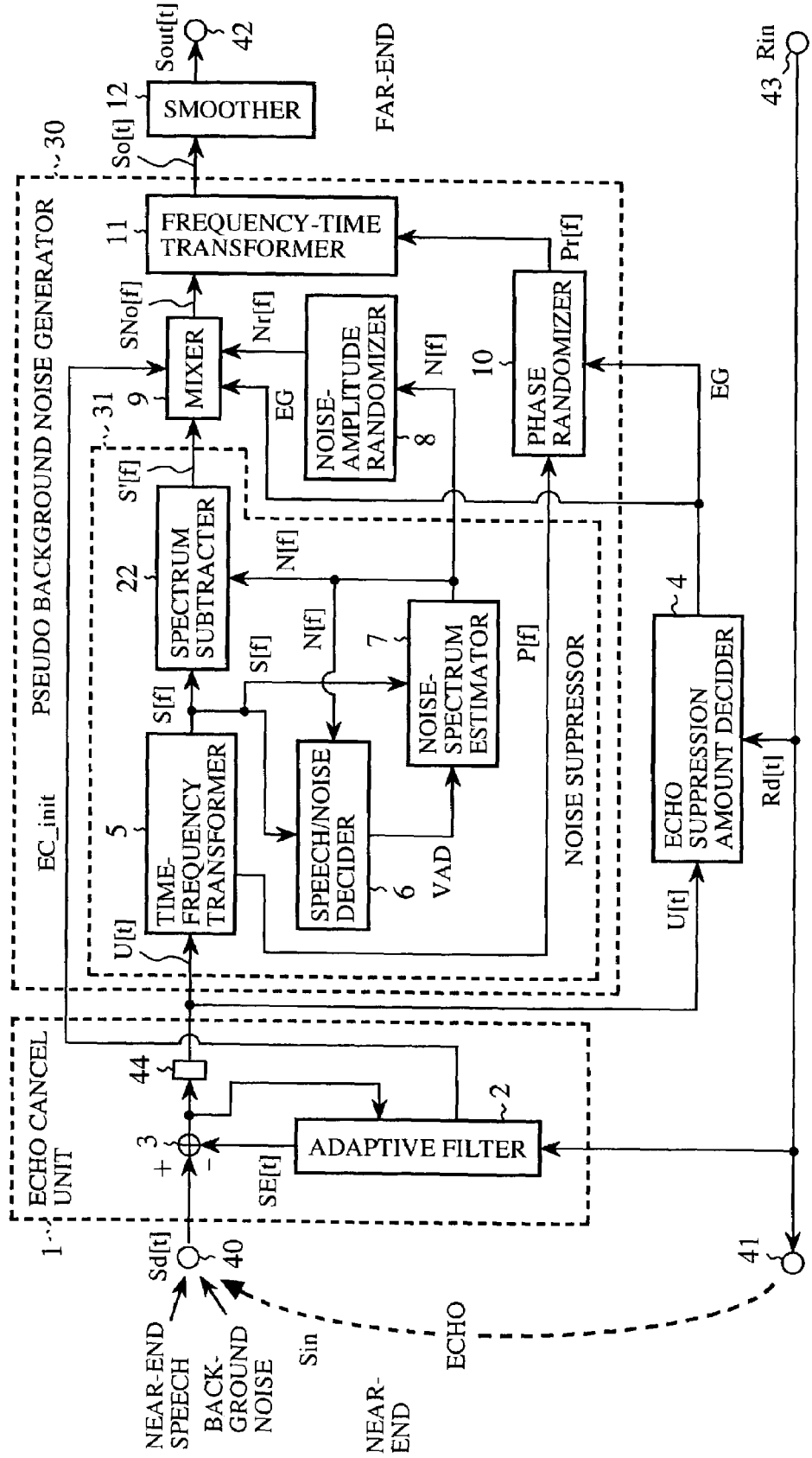
FIG. 11 is a block diagram illustrating the structure of an echo processor according to a seventh embodiment of the present invention.
Figure 12:
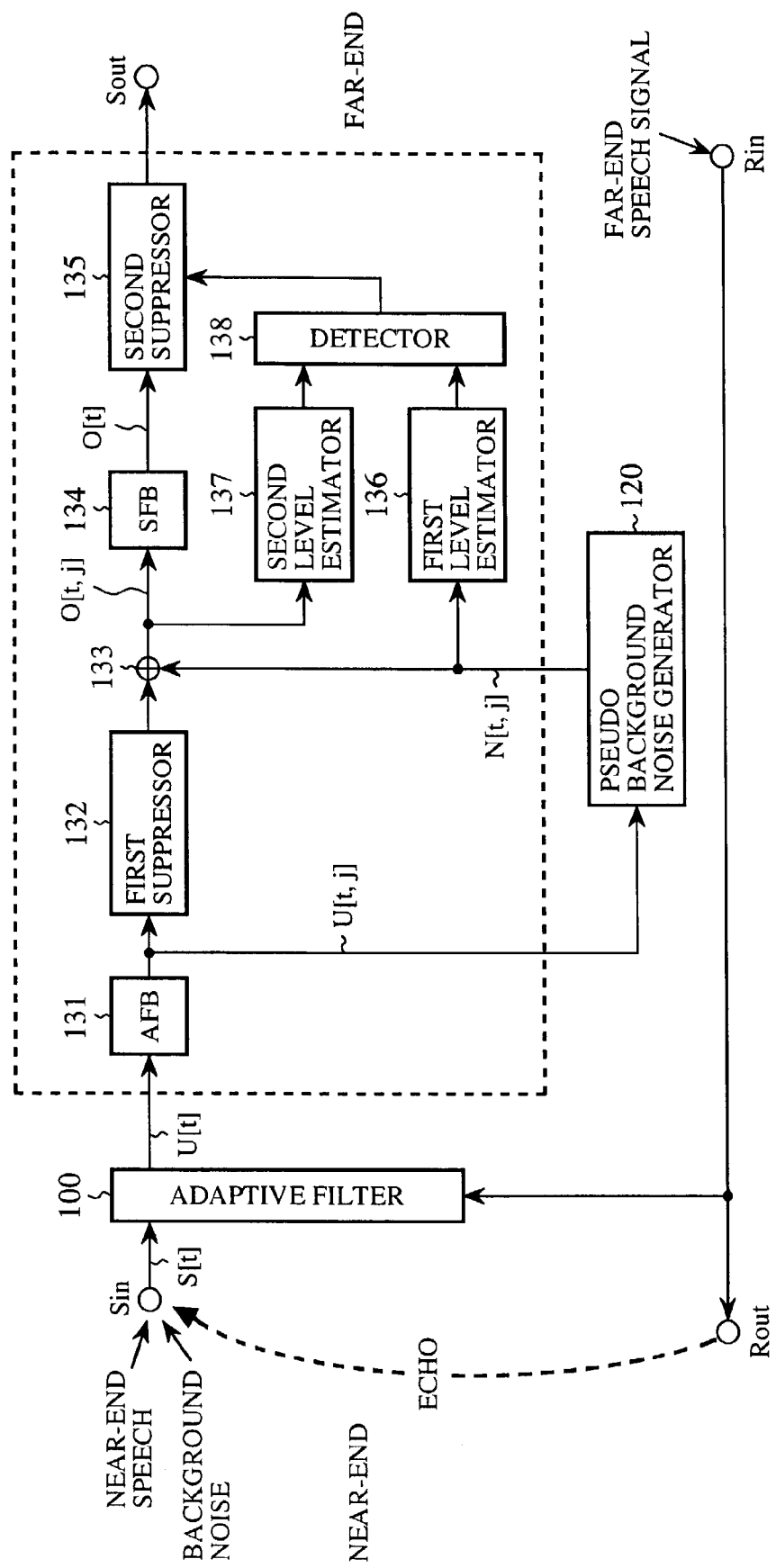
FIG. 12 is a block diagram illustrating the structure of a conventional echo processor.

FIG. 11 is a block diagram illustrating the structure of an echo processor according to a seventh embodiment of the present invention. The echo processor according to the seventh embodiment is a modification of the first embodiment shown in FIG. 1, and includes a spectrum subtracter 22 in addition to the first embodiment in FIG. 1. Other structural elements, which are the same as those in FIG. 1, will not be described in detail. Reference numeral 31 designates a noise suppressor that includes the time-frequency transformer 5, speech/noise decider 6, noise-spectrum estimator 7, and spectrum subtracter 22.

In the seventh embodiment, after the time-frequency transformer 5 transforms the echo-canceled outgoing input signal U[t] to the amplitude spectrum S[f], spectrum subtracter 22 applies a noise suppression to the amplitude spectrum S[f] by means of the known spectrum subtraction method.

Operations of the echo processor will be described next. The echo-canceled outgoing input signal U[t] of which the echo is canceled by the echo cancel unit 1 is input to the time-frequency transformer 5 that transforms the echo-canceled outgoing input signal U[t] to the amplitude spectrum S[f] and the phase spectrum P[f]. The speech/noise decider 6 decides as to whether the current frame involves the near-end speech or mostly involves to the background noise in a manner. e.g., described in conjunction with the first embodiment. Using the decision results, the noise-spectrum estimator 7 estimates a noise spectrum N[f].

The spectrum subtracter 22 is provided with the amplitude spectrum S[f] from the time-frequency transformer 5 and the noise spectrum N[f] from the noise-spectrum estimator 7. In the spectrum subtracter 22, a spectrum subtraction ratio $\alpha$(e.g., 1.2) and a constant A[f] are input precedently. Constant A is less than 1.0. Using the amplitude spectrum S[f], the noise spectrum N[f], and the spectrum subtraction ratio $\alpha$, the spectrum subtracter 22 calculates a noise-suppressed amplitude spectrum, i.e., a spectrum subtraction result S'[f] in accordance with formula (34).

$$S'[f]=S[f]-\alpha \cdot N[f] \quad (34)$$

Therefore, the noise spectrum N[f] times the subtraction ration $\alpha$ is subtracted from the amplitude spectrum S[f], thereby applying a noise suppression to the amplitude spectrum S[f]. However, if the calculated spectrum subtraction result S'[f] is less zero, the spectrum subtracter 22 discards the calculated spectrum subtraction result S'[f] and calculates the spectrum subtraction result S'[f] again in accordance with formula (35).

$$S'[f]=A[f] \cdot S[f] \quad (35)$$

The spectrum subtracter 22 supplies the spectrum subtraction result S'[f] to the mixer 9. The mixer 9 is provided with the noise spectrum Nr[f], the filter-initial-stage flag EC_init, and the residual-echo suppression amount EG. The structural elements and functions of the mixer 9 are substantially equivalent to those in the first embodiment. In other words, the structural elements and functions of the mixer 9 will be understood by those skilled in the art when "amplitude spectrum S[f]" in the description of the mixer 9 in the first embodiment is read for "spectrum subtraction result S'[f]." Operations of the other structural elements are the same as those in the first embodiment.

Although the echo processor in the above-described embodiment includes the echo cancel unit 1, the echo processor may exclude the echo cancel unit 1 in an alternative embodiment. The outgoing input signal Sd[t] may be directly input to the time-frequency transformer 5 in the alternative embodiment. Since the adaptive filter 2 is resultingly deleted, the selector 16 does not execute the selection on the basis of the filter-initial-stage flag EC_init.

As described above, in accordance with the seventh embodiment, since some elements are common to the echo processor and the noise suppressor 31 that performs the spectrum subtraction method, both of the noise suppression and the pseudo background noise production can be achieved by a simple construction.

Although the seventh embodiment uses the spectrum subtraction method for noise suppression, it is not intended to limit the present invention to the spectrum subtraction method. Rather the scope of the present invention covers alterations where other suitable noise suppression methods may be utilized. For example, the noise suppressor 31 may utilizes the noise suppression method disclosed in JP-A-2000-347688 entitled "Noise Suppressor" where the spectrum subtraction and the spectrum amplitude suppression are combined to each other.

While the present invention has been particularly shown and described with references to preferred embodiments thereof, it will be understood by those skilled in the art that various changes in form and details may be made therein without departing from the spirit and scope of the invention as defined by the claims. Such variations, alterations, and modifications are intended to be encompassed in the scope of the claims. For example, any characteristic part of any of the embodiments may be incorporated in another embodiment.

What is claimed is:

1. An echo processor comprising:
    an echo suppression amount decider configured to compare a first threshold state level of a to-be-sent signal including an echo with a second threshold state level of an incoming receive signal within a reception path, and configured to calculate an echo suppression amount on the basis of the comparison;
    a time-frequency transformer configured to transform the to-be-sent signal in the time domain into the frequency domain, thereby generating an amplitude spectrum and a phase spectrum;
    a noise-spectrum estimator configured to estimate a noise spectrum from the amplitude spectrum of the to-be-sent signal;
    a mixer configured to mix an amount of the noise spectrum, based on the echo suppression amount, with the amplitude spectrum; and
    a frequency-time transformer configured to generate an output signal including a noise in the time domain on the basis of the amplitude spectrum, with which said amount of the noise spectrum was mixed by the mixer, and the phase spectrum, and configured to output the output signal.

2. The echo processor as recited in claim 1, wherein the mixer includes an amplitude adjuster configured to adjust a spectrum amplitude of the amplitude spectrum on the basis of the echo suppression amount.

3. The echo processor as recited in claim 1, further comprising a spectrum subtracter configured to subtract the noise spectrum times the spectrum subtraction ratio from the amplitude spectrum, thereby obtaining a noise-suppressed amplitude spectrum, and configured to supply the mixer with the noise-suppressed amplitude spectrum for the amplitude spectrum.

4. The echo processor as recited in claim 1, wherein the mixer is configured to mix a great amount of the noise spectrum with the amplitude spectrum when the residual-echo suppression amount is greater than a prescribed value, and wherein the mixer is configured to decrease the amount of the noise spectrum to be mixed with the amplitude spectrum as the residual-echo suppression amount decreases below the prescribed value.

5. The echo processor as recited in claim 1, wherein the mixer is configured to displace the amplitude spectrum with the noise spectrum instead of mixing the noise spectrum with the amplitude spectrum when the residual-echo suppression amount is greater than a prescribed value.

6. The echo processor as recited in claim 1, further comprising:
  an adaptive filter configured to estimate a filter factor on the basis of the incoming input signal and electrical echogenicity of communication wires or acoustic echogenicity in an environment including a speaker and a microphone, and configured to generate a pseudo echo; and
  a subtracter configured to subtract the pseudo echo from the to-be-sent signal, thereby reducing the echo of the to-be-sent signal,
  wherein the mixer is configured to mix a great amount of the noise spectrum with the amplitude spectrum or displaces the amplitude spectrum with the noise spectrum until the filter factor of the adaptive filter converges.

7. The echo processor as recited in claim 1, wherein the mixer is configured to mix a greater amount of noise spectrum components with amplitude spectrum components at low frequencies of the amplitude spectrum in the input signal, and the mixer is configured to mix a lesser amount of noise spectrum components with amplitude spectrum components as frequency increases.

8. The echo processor as recited in claim 1, further comprising a random selector, and wherein the noise-spectrum estimator is configured to calculate a plurality of estimated noise spectra, and wherein the random selector is configured to randomly select one of the estimated noise spectra and outputs the selected estimated noise spectrum as the noise spectrum.

9. The echo processor as recited in claim 8, wherein the noise-spectrum estimator is configured to calculate a first estimated noise spectrum using a lower renewal rate and a second estimated noise spectrum using a higher renewal rate, and wherein the random selector is configured to randomly select one of the first and second estimated noise spectra and to output the selected estimated noise spectrum as the noise spectrum.

10. The echo processor as recited in claim 1, further comprising a weighting/adding unit, and wherein the noise-spectrum estimator is configured to calculate a plurality of estimated noise spectra, and wherein the weighting/adding unit is configured to execute weighting each of the estimated noise spectra, and adds the weighted noise spectra to each other, thereby obtaining a weighted mean noise spectrum, and wherein the weighting/adding unit outputs the weighted mean noise spectrum as the noise spectrum.

11. The echo processor as recited in claim 10, wherein the noise-spectrum estimator is configured to calculate a first estimated noise spectrum using a lower renewal rate and a second estimated noise spectrum using a higher renewal rate, and wherein the weighting/adding unit is configured to execute weighting each of the first and second estimated noise spectra, and to add the weighted noise spectra to each other, thereby obtaining a weighted mean noise spectrum, and wherein the weighting/adding unit outputs the weighted mean noise spectrum as the noise spectrum.

12. The echo processor as recited in claim 10, wherein the weighting/adding unit is configured to determine a weighting factor, which is used for weighting estimated noise spectra, randomly in a range for each noise spectrum component.

13. An echo processor comprising:
  an echo suppression amount decider configured to compare a first threshold state level of a to-be-sent signal including an echo with a second threshold state level of an incoming receive signal within a reception path, and configured to calculate an echo suppression amount on the basis of the comparison;
  a time-frequency transformer configured to transform the to-be-sent signal in the time domain into the frequency domain, thereby generating an amplitude spectrum and a phase spectrum;
  a noise-spectrum estimator configured to estimate a noise spectrum from the amplitude spectrum of the to-be-sent signal;
  a mixer configured to mix an amount of the noise spectrum with the amplitude spectrum;
  a phase randomizer configured to randomize a phase of the phase spectrum on the basis of the echo suppression amount; and
  a frequency-time transformer configured to generate an output signal including a noise in the time domain on the basis of the amplitude spectrum, with which said amount of the noise spectrum was mixed by the mixer, and the phase spectrum, of which the phase is randomized by the phase randomizer, and configured to output the output signal.

14. The echo processor as recited in claim 13, wherein the phase randomizer is configured to randomize the phase of the phase spectrum of the outgoing input signal at high frequencies when the residual-echo suppression amount is less than a prescribed value, and wherein the phase randomizer is configured to randomize the phase of the phase spectrum at low frequencies in addition to high frequencies as the residual-echo suppression amount increases beyond the prescribed value.

15. An echo processor comprising:
  a time-frequency transformer configured to transform a to-be-sent signal including an echo in the time domain into the frequency domain, thereby generating an amplitude spectrum and a phase spectrum;
  a noise-spectrum estimator configured to estimate a noise spectrum from the amplitude spectrum of the to-be-sent signal;
  a noise-amplitude randomizer configured to randomize amplitudes of the noise spectrum on the basis of a background noise level in the to-be-sent signal;
  a mixer configured to mix an amount of the noise spectrum based on a threshold comparison of levels of the to-be-sent signal and an incoming receive signal within a reception path, of which the amplitude of the noise is randomized by the noise-amplitude randomizer, with the amplitude spectrum; and
  a frequency-time transformer configured to generate an output signal including a noise in the time domain on the basis of the phase spectrum and the amplitude spectrum, with which the noise spectrum is mixed by the mixer, and configure to output the output signal.

16. The echo processor as recited in claim 15, wherein the noise-amplitude randomizer is configured to randomize the amplitude of the noise spectrum at high frequencies when the background noise level in the outgoing input signal to be sent is less than a prescribed value, and wherein the noise-amplitude randomizer is configured to randomize the amplitude of the noise spectrum at low frequencies in addition to high frequencies as the background noise level increases beyond the prescribed value.

* * * * *